(12) United States Patent
Nesteroff et al.

(10) Patent No.: US 12,075,337 B2
(45) Date of Patent: Aug. 27, 2024

(54) RADIO ACCESS NETWORK TRACKING AREA VISUALIZATION MANAGEMENT AND MONITORING

(71) Applicant: Juniper Networks, Inc., Sunnyvale, CA (US)

(72) Inventors: Lyubov Nesteroff, Pleasant Hill, CA (US); Arda Akman, San Ramon, CA (US); Yelena Kozlova, Sunnyvale, CA (US); Ojas Gupta, Mountain View, CA (US); Fatima Rafiqui, San Jose, CA (US); Jeremy Alan Tidemann, Savoy, IL (US); Marc-Andre Bordeleau, Shawinigan (CA)

(73) Assignee: Juniper Networks, Inc., Sunnyvale, CA (US)

( * ) Notice: Subject to any disclaimer, the term of this patent is extended or adjusted under 35 U.S.C. 154(b) by 336 days.

(21) Appl. No.: 17/644,973

(22) Filed: Dec. 17, 2021

(65) Prior Publication Data
US 2023/0199623 A1 Jun. 22, 2023

(51) Int. Cl.
*H04W 48/08* (2009.01)
*H04W 4/021* (2018.01)
(Continued)

(52) U.S. Cl.
CPC .......... *H04W 48/08* (2013.01); *H04W 4/021* (2013.01); *H04W 16/22* (2013.01); *H04W 48/16* (2013.01)

(58) Field of Classification Search
CPC . H04L 43/0888; H04L 43/028; H04L 43/045; H04L 41/22; H04W 16/22;
(Continued)

(56) References Cited

U.S. PATENT DOCUMENTS 7,146,568 B2   12/2006   Richardson
9,363,146 B2   6/2016    Cossins et al.
(Continued)

FOREIGN PATENT DOCUMENTS

WO   2018/083664 A1   5/2018

OTHER PUBLICATIONS

3GPP Draft, "Reporting the Number of UEs in Certain Geographic Area", 3rd Generation Partnership Project (3GPP), Jan. 2015, 4 pp.
(Continued)

*Primary Examiner* — Brian D Nguyen
(74) *Attorney, Agent, or Firm* — Shumaker & Sieffert, P.A.

(57) ABSTRACT

A computing device is configured to: obtain information of tracking areas including a first and second tracking area, the first tracking area comprising first cells and the second tracking area comprising second cells; generate a user interface with a visualization of the tracking areas, the user interface comprising first cell user interface elements visually representing the first cells and second cell user interface elements visually representing the second cells; output the user interface for display at a display device; receive user input indicative of filtering criteria; generate a modified user interface by modifying at least one of the first cell user interface elements or the second user interface elements to visually indicate the first tracking area satisfies the filtering criteria and the second tracking area does not satisfy the filtering criteria; and output the modified user interface for display at the display device.

20 Claims, 20 Drawing Sheets

(51) Int. Cl.
*H04W 16/22* (2009.01)
*H04W 48/16* (2009.01)

(58) Field of Classification Search
CPC ..... H04W 48/08; H04W 24/02; H04W 48/16; H04W 4/021
See application file for complete search history.

(56) References Cited

U.S. PATENT DOCUMENTS

| | | | |
|---|---|---|---|
| 11,869,158 B2* | 1/2024 | Caswell | G06T 19/006 |
| 2005/0004944 A1 | 1/2005 | Cossins et al. | |
| 2011/0040896 A1 | 2/2011 | DeCusatis et al. | |
| 2011/0151864 A1 | 6/2011 | Byun et al. | |
| 2014/0006956 A1 | 1/2014 | Huliyar et al. | |
| 2017/0085493 A1 | 3/2017 | Senarath et al. | |
| 2017/0311115 A1 | 10/2017 | Adrangi et al. | |
| 2018/0152958 A1 | 5/2018 | Arnold et al. | |
| 2019/0037518 A1* | 1/2019 | Russell | H04L 65/1016 |
| 2019/0123963 A1 | 4/2019 | Tang et al. | |
| 2019/0140933 A1 | 5/2019 | Gulm Bernat et al. | |
| 2019/0327657 A1 | 10/2019 | Han et al. | |
| 2019/0335249 A1 | 10/2019 | Shimy et al. | |
| 2020/0154459 A1 | 5/2020 | Mukherjee et al. | |
| 2020/0186411 A1 | 6/2020 | Ravichandran et al. | |
| 2020/0313985 A1 | 10/2020 | Jayakumar et al. | |
| 2021/0014737 A1 | 1/2021 | Yang et al. | |
| 2021/0151056 A1 | 5/2021 | Trim et al. | |
| 2021/0160153 A1 | 5/2021 | Akman et al. | |
| 2021/0226847 A1 | 7/2021 | Jindal et al. | |
| 2021/0306938 A1 | 9/2021 | Seetharaman et al. | |
| 2021/0320897 A1 | 10/2021 | Stojanovski et al. | |
| 2021/0327009 A1* | 10/2021 | Williams | G09B 5/00 |
| 2022/0021723 A1* | 1/2022 | Oyman | H04L 65/80 |
| 2022/0043731 A1* | 2/2022 | Larson | G06F 11/3452 |
| 2022/0322058 A1* | 10/2022 | Etuke | H04W 4/029 |
| 2023/0262828 A1* | 8/2023 | Neelakantamurthy | H04W 12/72 370/329 |

OTHER PUBLICATIONS

3GPP Standard, "3rd Generation Partnership Project; Technical Specification Group Services and System Aspects; Study of Enablers for Network Automation for 5G (Release 16)", Technical Report, Mar. 2019, pp. 1-124.

3GPP Standard, "3rd Generation Partnership Project; 1-12 Technical Specification Group Services and System Aspects; Procedures for the 5G System (5GS) ; Stage 2 (Release 17)", Sep. 2021, pp. 1-713.

Extended Search Report from counterpart European Application No. 22160285.7 dated Aug. 5, 2022, 14 pp.

Hu et al., "Visualizing Network Communication in Geographic Environment," IEEE, 2013 International Conference on Virtual Reality and Visualization (ICVRV), Sep. 14-15, 2013, Xi'an, China, pp. 206-212, DOI: 10.1109/CVRV.2013.39.

"Service requirements for the 5G system," 3rd Generation Partnership Project; Technical Specification Group Services and System Aspects; Stage 1, Release 17, 3GPP TS 22.261 V17.0.0, Sep. 2019, 83 pp.

"System architecture for the 5G System (5GS)," 3rd Generation Partnership Project; Technical Specification Group Services and System Aspects; Stage 2, Release 16, 3GPP TS 23.501 V16.2.0, Sep. 2019, 376 pp.

Study on management and orchestration of network slicing for next generation network 3rd Generation Partnership Project; Technical Specification Group Services and System Aspects; Stage 2, Release 15, 3GPP TSG TR 28.801, V15.1.0, Jan. 2018, 75 pp.

China Mobile et al: "Solution for Key Issue 14: How to ensure that slice SLA is guaranteed," a 3GPP Draft; S2-1813213 was 12836 Solution for KI 14 Slice SLA Guarantee V4.5, 3rd Generation Partnership Project (3GPP), Mobile Competence Centre; West Palm Beach, Florida, USA; Oct. 26-30, 2018, Accessed Dec. 2, 2018, 4 pp.

China Telecom et al: "Discussion on network slice priority," a 3GPP Draft; S5-185607 Discussion On Network Slice Priority, 3rd Generation Partnership Project (3GPP), Mobile Competence Centre; Belgrade (Serbia); Aug. 20-24, 2018, Accessed Dec. 11, 2018, 2 pp.

China Mobile et al: "System architecture for the 5G System (5GS)" a 3GPP Draft; 3rd Generation Partnership Project 2021, Technical Specification Group Services and System Aspects; System architecture for the 5G System (5GS); Stage 2 (Release 17), TS 23.501 V17.0.0 (Mar. 2021), Accessed Dec. 16, 2021, 489 pp.

Response to Extended Search Report dated Aug. 5, 2022, from counterpart European Application No. 22160285.7 filed Dec. 20, 2023, 24 pp.

* cited by examiner

Services / Templates / Communication Service / Service Order

Service Order ②
●─────○ Summary
General Area of Service Subscribers

Cancel Back Next

Slices ▾ Carrier ▾ + 🗑 ⊙ Map ⌕ ▽ ⋯

> ☐ TRACKING AREA1    812A
> (Mountain View, CA)

| Total Femcocells | Selected | Status | Number of Users |
|---|---|---|---|
| 8 | 8 | ⊙ | 16 |

> ☐ TRACKING AREA2    812B
> (Mountain View, CA)

| Total Picocells | Selected | Status | Number of Users |
|---|---|---|---|
| 16 | 0 | ⊙ | 32 |

> ☐ TRACKING AREA3    812C
> (Mountain View, CA)

| Total Microcells | Selected | Status | Number of User |
|---|---|---|---|
| 8 | 8 | ⓘ — 818 | 200 |

Services / Templates / Communication Service / Service Order

Service Order ⓘ

General —●— Area of Service —○— Subscribers —○— Summary

Cancel | Back | Next

Slices ▾ | Carrier ▾ | + | 🗑 | ⌕ Map Q | ▽▾ | ⋯

> ☐ TRACKING AREA1 _812A_ | Total Femcocells | Selected | Status | Number of Users
> (Mountain View, CA) | 8 | 8 | | 16

| Name | Description | Location _820_ | Status | RIC | Number of Users |
|---|---|---|---|---|---|
| ▷ Femtocells1 | Description | xxx, Sunnyvale | ⓢ Success | RIC2: edge2 | 2 |
| ▷ Femtocells2 | Description | Mountain View | ⓢ Success | RIC1: edge1 | 2 |
| ▷ Femtocells3 | Description | Mountain View | ⓢ Success | RIC1: edge1 | 3 |
| ▷ Femtocells4 | Description | xxx, Sunnyvale | ⓢ Success | RIC2: edge2 | 3 |
| ▷ Femtocells5 | Description | Mountain View | ⓢ Success | RIC1: edge1 | 2 |
| ▷ Femtocells6 | Description | xxx, Sunnyvale | ⓢ Success | RIC2: edge2 | 1 |
| ▷ Femtocells7 | Description | xxx, Sunnyvale | ⓢ Success | RIC2: edge2 | 1 |
| ▷ Femtocells8 | Description | xxx, Sunnyvale | ⓢ Success | RIC2: edge2 | 2 |

8 Items

> ☐ TRACKING AREA2 _812B_ | Total Picocells | Selected | Status | Number of Users
> (Mountain View, CA) | 16 | 0 | | 32

> ☐ TRACKING AREA3 _812C_ | Total Microcells | Selected | Status | Number of Users
> (Mountain View, CA) | 8 | 8 | ⓘ | 200

Services / Templates / Communication Service / Service Order

Service Order ⑦

●────────●────────○
General  Area of Service  Subscribers  Summary

Cancel | Back | Next

| Status= SUCCESS × | + | | Slices ▾ | Carrier ▾ | + | 🗑 | ⌕ Map ⊙ | ▽ ▾ | ⋯ |

| | | | | | | × | Apply | | Save |

> ☐ TRACKING AREA1
(Mountain View, CA)

| | | | Total Femcocells 8 | Selected 8 | Status ⊙ | Number of Users 16 |

| Name | Description | Location | Status | | RIC | Number of Users |
|---|---|---|---|---|---|---|
| ☑ Femtocells1 | Description | xxx, Sunnyvale | ⊙ Success | | RIC2: edge2 | 2 |
| ☑ Femtocells2 | Description | Mountain View | ⊙ Success | | RIC1: edge1 | 4 |
| ☑ Femtocells3 | Description | Mountain View | ⊙ Success | | RIC1: edge1 | 3 |
| ☑ Femtocells4 | Description | xxx, Sunnyvale | ⊙ Success | | RIC2: edge2 | 3 |
| ☑ Femtocells5 | Description | Mountain View | ⊙ Success | | Ric1: edge1 | 2 |
| ☑ Femtocells6 | Description | xxx, Sunnyvale | ⊙ Success | | RIC2: edge2 | 1 |
| ☑ Femtocells7 | Description | xxx, Sunnyvale | ⊙ Success | | RIC2: edge2 | 1 |
| ☑ Femtocells8 | Description | xxx, Sunnyvale | ⊙ Success | | RIC2: edge2 | 2 |

8 Items

> ☐ TRACKING AREA2
(Mountain View, CA)

| Total Picocells 16 | Selected 0 | Status ⊙ | Number of Users 32 |

FIG. 8E

Services / Templates / Communication Service / Service Order

Service Order ⓘ

General — Area of Service — Subscribers — Summary

Cancel Back Next

⊘ Status= FAIL × AND RIC = RIC2: edge2 × + — 826

Slices ˅ Carrier ˅ + 🗑  ⌖ Map ⌕  ▽· ⋯

× Apply

| | | 828 | Total Microcells | Selected | | Number of Users |
|---|---|---|---|---|---|---|
| | | | 8 | 8 | Status | 200 |

› ☐ TRACKING AREA1
(Mountain View, CA)

| ☐ Name | Description | Location | Status | RIC | Number of Users |
|---|---|---|---|---|---|
| ☐ Microcells1 | Description | xxx, Sunnyvale | ⊘ Fail | RIC2: edge2 | 36 |
| ☐ Microcells2 | Description | xxx, Sunnyvale | ⊘ Fail | RIC1: edge2 | 41 |
| ☐ Microcells3 | Description | xxx, Sunnyvale | ⊘ Fail | RIC1: edge2 | 18 |

3 Items

FIG. 8F

RADIO ACCESS NETWORK TRACKING AREA VISUALIZATION MANAGEMENT AND MONITORING

TECHNICAL FIELD

The disclosure relates to computer networking, and more specifically, to visualization management and monitoring of tracking areas in mobile networks.

BACKGROUND

Computer networks have become ubiquitous and the number of network applications, network-connected devices, and types of network-connected devices rapidly expanding. Such devices now include computers, smart phones, Internet-of-Things (IoT) devices, cars, medical devices factory equipment, etc. An end-user network-connected device typically cannot directly access a public network such as the Internet. Instead, and end-user network device establishes a network connection with an access network, and the access network communicates with a core network that is connected to one or more data networks (DNs) offering services. There are several different types of access networks currently in use. Examples include Radio Access Networks (RANs) that are access networks for $3^{rd}$ Generation Partnership Project (3GPP) networks, trusted and untrusted non-3GPP networks such as Wi-Fi or WiMAX networks, and fixed/wireline networks such as Digital Subscriber Line (DSL), Passive Optical Network (PON), and cable networks. The core network may be that of a mobile service provider network, such as a 3G, 4G/LTE, or 5G network.

A RAN for a 5G network includes a plurality of cell sites (or simply "cells") that each include radio equipment, such as base stations (also known as gNodeB ("gNB")), to exchange packetized data within a data network to ultimately access one or more applications or services provided by the data network. To efficiently track and locate user equipment in the 5G RAN, cells of the RAN may be grouped into a "tracking area," and one or more tracking areas may be assigned to a user equipment as a "registration area" that is used to search for the user equipment and for the user equipment to indicate its location.

5G networks may support network slicing to provide many logical network segments over a common single physical network. A network slice provides a way to completely segment the network to support particular types of services or businesses. Each network slice is optimized according to capacity, coverage, connectivity, security, and performance characteristics such as delay. A network slice may span multiple network domains, such as a RAN and core network. To establish a network slice within a 5G RAN, one or more tracking areas can be defined for use by the network slice.

SUMMARY

In general, the disclosure describes techniques for visualization management and monitoring of tracking areas in mobile networks. For example, a 5G RAN includes multiple cells that each include radio equipment (e.g., base stations) and that are grouped into multiple "tracking areas" that can be used to implement a network slice within the mobile network. In some examples, a monitoring system, e.g., Service Management and Orchestrator (SMO), for the mobile network may provide visualization management and monitoring of tracking areas in mobile networks. A mobile network operator (MNO) may manage the mobile network and deploy the monitoring system. The monitoring system may obtain information of the tracking areas within the mobile network, and generate, for example, a user interface (UI) comprising UI elements representing one or more of the tracking areas. In some examples, the monitoring system may provide visualization management, such as filtering of the visualization of tracking areas based on filtering criteria (e.g., by a particular tracking area and/or by a particular mobile network virtual network operator, frequency, or network slice) and/or monitoring of the tracking areas to obtain additional information or insights of the cells within the tracking areas and/or generation of alerts based on the status of the cells of the tracking areas.

The techniques may provide one or more technical advantages that realize at least one practical application. For example, by providing a user interface by which a user may manage and monitor tracking areas in mobile networks, a user may quickly locate and obtain additional details of individual cells of tracking areas that implement network slices. Moreover, in the event of a failure of one or more cells of tracking areas used to implement network slices, the techniques may provide alerts or other visual indications to trigger faster response times to perform corrective actions compared to traditional mobile network monitoring systems.

In one example, a computing device includes one or more processors and a memory comprising instructions that when executed by the one or more processors cause the one or more processors to: obtain information for a plurality of tracking areas including a first tracking area and a second tracking area, the first tracking area comprising a plurality of first cells and the second tracking area comprising a plurality of second cells; generate, based on the information for the plurality of tracking areas, a user interface providing a visual representation of the plurality of tracking areas, wherein the user interface comprises first cell user interface elements each providing a visual representation of a corresponding cell of the plurality of first cells of the first tracking area and second cell user interface elements each providing a visual representation of a corresponding cell of the plurality of second cells of the second tracking area; output the user interface for display at a display device; receive user input data indicative of filtering criteria to filter the user interface; generate, in response to receiving the filtering criteria, a modified user interface by modifying at least one of the first cell user interface elements or the second cell user interface elements to visually indicate the first tracking area comprising the plurality of first cells satisfies the filtering criteria and the second tracking area comprising the plurality of second cells does not satisfy the filtering criteria; and output the modified user interface for display at the display device.

In another example, a method includes obtaining, by a computing device, information for a plurality of tracking areas including a first tracking area and a second tracking area, the first tracking area comprising a plurality of first cells and the second tracking area comprising a plurality of second cells; generating, by the computing device and based on the information for the plurality of tracking areas, a user interface representing a visualization of the plurality of tracking areas, wherein the user interface comprises first cell user interface elements each providing a visual representation of a corresponding cell of the plurality of first cells of the first tracking area and second cell user interface elements each providing a visual representation of a corresponding cell of the plurality of second cells of the second tracking area; receiving, by the computing device, user input data indicative of filtering criteria to filter the user interface; in response to receiving the user input data indicative of filtering criteria, generating, by the computing device, a modified user interface by modifying at least one of the first cell user interface elements or the second cell user interface elements to visually indicate the first tracking area comprising the plurality of first cells satisfies the filtering criteria and the second tracking area comprising the plurality of second cells does not satisfy the filtering criteria; and output the modified user interface for display at the display device.

In another example, a non-transitory computer-readable medium includes instructions that, when executed, cause one or more processors to: obtain information for a plurality of tracking areas including a first tracking area and a second tracking area, the first tracking area comprising a plurality of first cells and the second tracking area comprising a plurality of second cells; generate, based on the information for the plurality of tracking areas, a user interface representing a visualization of the plurality of tracking areas, wherein the user interface comprises first cell user interface elements each providing a visual representation of a corresponding cell of the plurality of first cells of the first tracking area and second cell user interface elements each providing a visual representation of a corresponding cell of the plurality of second cells of the second tracking area; output the user interface for display at the display device; receive user input data indicative of filtering criteria to filter the visualization of the user interface; generate, in response to receiving the user input data indicative of filtering criteria, a modified user interface by modifying at least one of the first cell user interface elements or the second cell user interface elements to visually indicate the first tracking area comprising the plurality of first cells satisfies the filtering criteria and the second tracking area comprising the plurality of second cells does not satisfy the filtering criteria; and output the modified user interface for display at the display device.

The details of one or more examples are set forth in the accompanying drawings and the description below. Other features, objects, and advantages will be apparent from the description and drawings, and from the claims.

BRIEF DESCRIPTION OF DRAWINGS

FIGS. 8A-8F are conceptual views of a user interface for visualizing the status of tracking areas, in accordance with techniques described in the disclosure.

DETAILED DESCRIPTION

Figure 1:
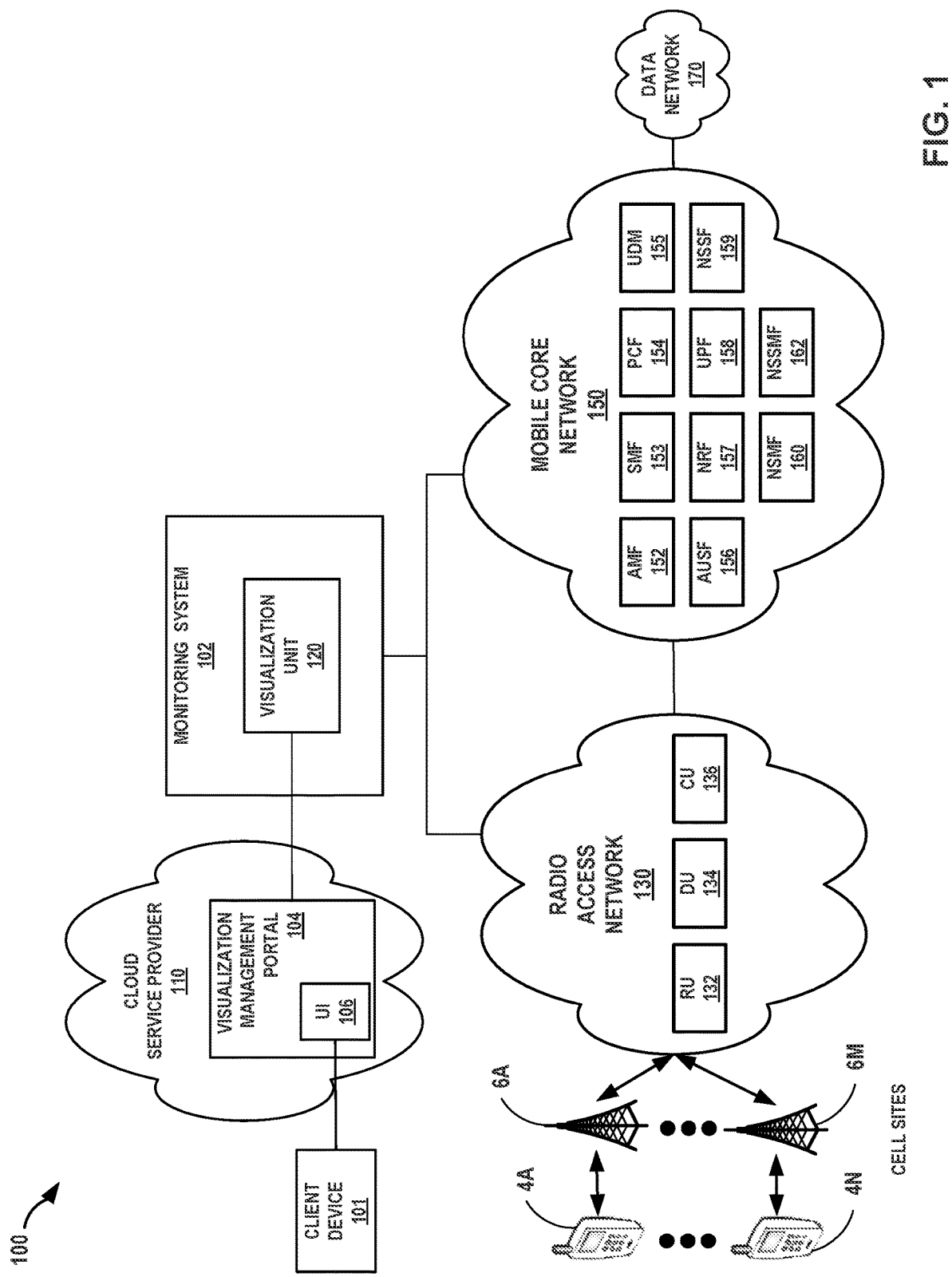
FIG. 1 is a block diagram illustrating an example network system, according to techniques of the disclosure.

FIG. 1 is a block diagram illustrating an example network system, according to techniques of the disclosure. In the example illustrated in FIG. 1, network system 100 includes radio access network (RAN) 130 and mobile core network 150 that provide user equipment 4A-4N (collectively "UEs 4") with access to one or more applications or services provided by data network 170.

UEs 4 may represent smartphones, desktop computers, laptop computers, tablets, smart watches, and/or "Internet-of-Things" (IoT) devices, such as cameras, sensors, televisions, appliances, or the like. As shown in FIG. 1, network system 100 includes RAN 130 that provides network access, data transport, and other services to UEs 4. In this example, RAN 130 may implement, for example, a 5G-radio access network. For example, RAN 130 comprises a plurality of cell sites (or simply "cells") that each include radio equipment, such as base stations 6A-6M (collectively, "base stations 6"), also known as gNodeBs, to exchange packetized data within a data network to ultimately access one or more applications or services provided by the data network. Each of base stations 6 is divided into three functional components: Radio Unit (RU) 132, Distributed Unit 134, and Central Unit (CU) 136, which can be deployed in various configurations. RU 132 manages the radio frequency layer and has antenna arrays of various sizes and shapes. DU 134 performs lower layer protocol processing. CU 136 performs the upper layer protocol processing. The CU is also divided into the control plane and user plane functions, CU-CP and CU-UP, respectively. Depending on operator and service requirements, base stations 6 can be deployed monolithically, i.e., RU, DU, and CU reside within a cell site, or these functionalities can be distributed across cell sites while the CU resides in an edge cloud site controlling a plurality of distributed DUs.

In some aspects, resources associated with a service to a user may be provided by, or managed by, functions of core 150. In some aspects, core 150 implements various discrete control plane and user plane functions for network system 100. In some aspects, core 150 includes 5G control plane functions such as Access Mobility Management Function (AMF) 152, Session Management Function (SMF) 153, Policy Control Function (PCF) 154, User Data Management (UDM) 155, Network Repository Function (NRF) 157, Authentication Server Function (AUSF) 156, and Network Slice Selection Function (NSSF) 159. AMF 152 may provide access mobility management services. SMF 153 may provide session management services. PCF 154 may provide policy control services. Unified Data Management (UDM) function 155 may manage network user data. AUSF 156 may provide authentication services. Network Repository Function (NRF) 157 may provide a repository that can be used to register and discover services in a network operator's network. Network Slice Selection Function (NSSF) 159 may be used to select an instance of an available network slice for use by a UE device. Core 150 may also include User Plane Functions (UPF) 158. UPF 158 may provide packet routing, forwarding and other network data processing functions (e.g., Quality of Service, packet inspection, traffic optimization etc.). Further details on services and functions provided by AMF 152, SMF 153, PCF 154, UDM 155, NRF 157, AUSF 156 NRF 157, UPF 158 and NSSF 159 can be found in 3$^{rd}$ Generation Partnership Project 2021, *Technical Specification Group Services and System Aspects; System architecture for the 5G System (5GS); Stage* 2 (*Release* 17), TS 23.501 V17.0.0 (2021-03), the entire contents of which is hereby incorporated by reference.

To efficiently manage (e.g., track and locate) user equipment, cells of RAN 130 may be grouped into a "tracking area," and one or more tracking areas may be assigned to a user equipment as a "registration area" that is used to search for the user equipment and for the user equipment to indicate its location. For example, handshaking protocols can be avoided when a UE moves from one cell in a tracking area to another cell in the same tracking area. A UE is said to be within a cell, a tracking area, and a registration area, at any point in time.

5G networks may support network slicing. The 3GPP standards architected a sliceable 5G infrastructure to provide many logical network segments over a common single physical network. A network slice provides a way to completely segment the network to support particular types of services or businesses. Each network slice is optimized according to capacity, coverage, connectivity, security, and performance characteristics such as delay. In some examples, ultra-low latency (URLLC) services may require very low latency, high mobility, low throughput, a highly reliable control plane, and a high-performance user plane. In other examples, enhanced Mobile Broadband (eMBB) services may require high bandwidth but low latency. In other examples, Massive Machine-Type Communications (mMTC) services may require high connection density of online devices. In these examples, network slices (e.g., for URLLC, eMBB, and/or mMTC services) may be implemented within network system 100 in accordance with service level agreements (SLA).

Provisioning a network slice in a 5G network can involve multiple services and multiple service providers. For example, provisioning an end-to-end network slice may involve provisioning network functions to support the network slice in multiple geographically distributed data centers ("multi-cloud") and may further involve provided and implemented in multiple network domains ("multi-domain"), such as RANs, transport networks, core network services, and service gateway interfaces (SGi). A provisioning system (not shown), e.g., a Service Management and Orchestration (SMO) system, may assign communications infrastructure and resources needed to provision the network slices that fulfill the SLAs. To implement a network slice within RAN 130, one or more tracking areas can be associated with the network slice, and one or more cells are mapped to each tracking area. For example, a user may want to localize where a network slice is provisioned and can do so by selecting the desired tracking areas for the network slice. A network slice provisioned within RAN 130 is consistent throughout the tracking area. That is, the network slice provisioned within RAN 130 is consistent for all cells mapped to the selected tracking area).

In accordance with the techniques of this disclosure, network system 100 includes a monitoring system 102 to provide visualization management and monitoring of tracking areas in mobile networks. In some examples, monitoring system 102 may be part of a provisioning system (e.g., SMO), or communicatively coupled to the provisioning system to obtain information of one or more tracking areas of network slices implemented in RAN 130. In the example illustrated in FIG. 1, monitoring system 102 obtains information of tracking areas of implemented network slices, such as information from a Network Slice Management Function (NSMF) and/or Network Slice Subnet Management Function (NSSMF) of the provisioning system that manages and orchestrates network slices. In some examples, monitoring system 102 may obtain information such as the status of cells of tracking areas, location of cells of tracking areas, the type of service (e.g., private or public) provided by cells of tracking areas, number of subscribers of cells of tracking areas, frequency bands of the cells of tracking areas, number of network slices associated with the tracking areas, traffic throughput of the cells of tracking areas (e.g., in-traffic, out-traffic). For example, the information is collected using, e.g., in-band and/or out-of-band data collection methods from base stations, at RAN protocol layers 1, 2, and 3 gathered either using the actual user packet flows or synthetically generated packet flows. This information may further be broken down into per RU, DU and CU components, and midhaul and fronthaul facilities, to factor in any delay, packet loss or availability associated with these specific subcomponents of the RAN. In some examples, monitoring system 102 may obtain information of tracking areas during onboarding of devices or through the integration with Operations Support Systems (OSS)/Business Support Systems (BSS). Based on the obtained information of the tracking areas of RAN 130, a visualization unit 120 of monitoring system 102 generates, for example, a user interface representing a visualization of the tracking areas of network slices implemented within RAN 130, as further described below.

Visualization management portal 104 provides an interface for use by client device 101 to manage visualizations of tracking areas and monitor tracking areas of implemented network slices. In some examples, visualization management portal 104 can present a user interface 106 that presents user interface elements (e.g., screens, menus, maps, etc.) for managing the visualization of tracking areas and/or monitoring the tracking areas.

Client device 101 can be an end-user computing device that receives user interface 106 elements for presentation, via display coupled to client device 101, to a user operating client device 101. In some examples, client device 101 may be operated by a tenant (e.g., customer) of a mobile network operator and used to manage the visualization of tracking areas of implemented network slices. In some examples, client device 101 may be operated by an administrator of the mobile network and used to manage the visualization of tracking areas of implemented network slices for tenants or for the use of the mobile network operator.

Visualization management portal 104 can be communicatively coupled to client device 101 and monitoring system 102. In the example illustrated in FIG. 1, visualization management portal 104 is executed in a cloud computing environment provided by cloud service provider 110. However, visualization management portal 104 may be executed in other environments. For example, visualization management portal 104 may be a component of monitoring system 102. Further, provisioning portal 104 may be a component of a server or other computing device in a data center, such as a data center of a mobile network operator.

As further described below, monitoring system 102 includes a visualization unit 120 that generates, based on the obtained information for the tracking areas of network slices implemented within RAN 130, a user interface representing a visualization of the plurality of tracking areas. The user interface may comprise one or more user interface elements each representing a group of tracking areas or cells of a tracking area. For example, the user interface may include user interface elements providing a visual representation of a plurality of cells of a tracking area (referred to herein as "cell user interface elements"). Monitoring system 102 may generate each of the one or more cell user interface elements with visual characteristics (e.g., color, size, etc.) to visually indicate, for example, a status of the cell of a tracking area, a type of the cell of the tracking area, subscriber density of the cell of the tracking area, traffic throughput of the cell of the tracking area, etc. As one example, monitoring system 102 may generate a cell user interface element representing a cell of a tracking area with a particular color (e.g., red) or symbol to provide a visual indication of the status of the cell.

In some examples, visualization unit 120 may generate the user interface to further include user interface elements representing detailed information about a selected tracking area or cell, such as a pop-up user interface element (e.g., pop-up window) overlaid on the user interface that includes additional information about the selected tracking area or cell.

In some examples, visualization unit 120 may generate a user interface representing a filtered visualization of the plurality of tracking areas based on filtering criteria. For example, a user may use client device 101 to specify filtering criteria via user interface 106 provided by visualization management portal 104. As further described below, a user may specify filtering criteria including, for example, a particular tracking area, tracking areas of a particular mobile provider (or mobile provider frequency), and/or tracking areas of implemented network slices for a particular type of service. Monitoring system 102 may in response to receiving the user input data indicative of filtering criteria, modify one or more cell user interface elements of tracking areas (e.g., remove from display, configure with a different color, etc.) to visually indicate the one or more tracking areas that satisfy the filtered criteria and the one or more tracking areas that do not satisfy the filtered criteria.

Figure 2A:
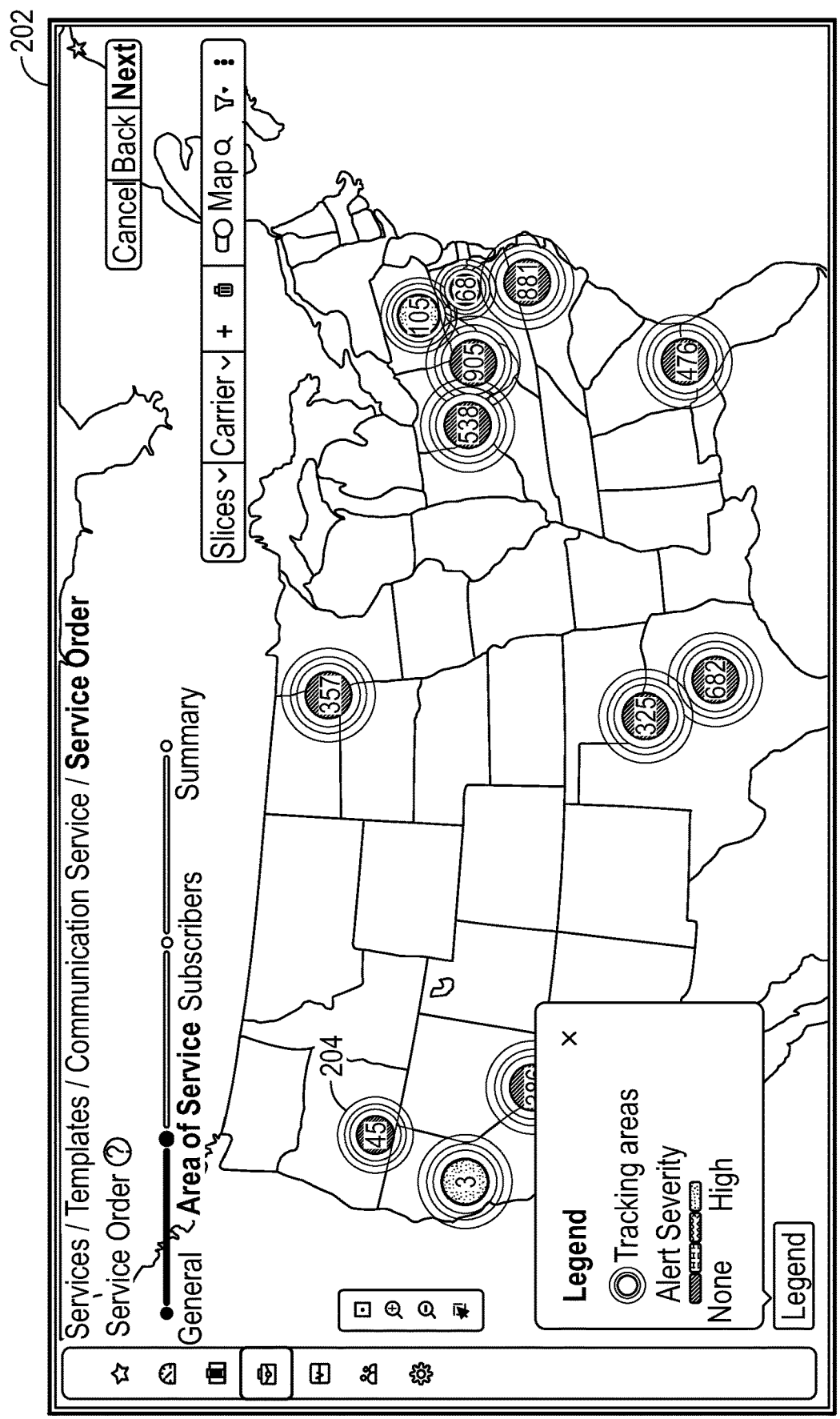
FIGS. 2A-2B are conceptual views of a user interface for visualizing tracking areas, in accordance with techniques described in the disclosure.
Figure 2B:
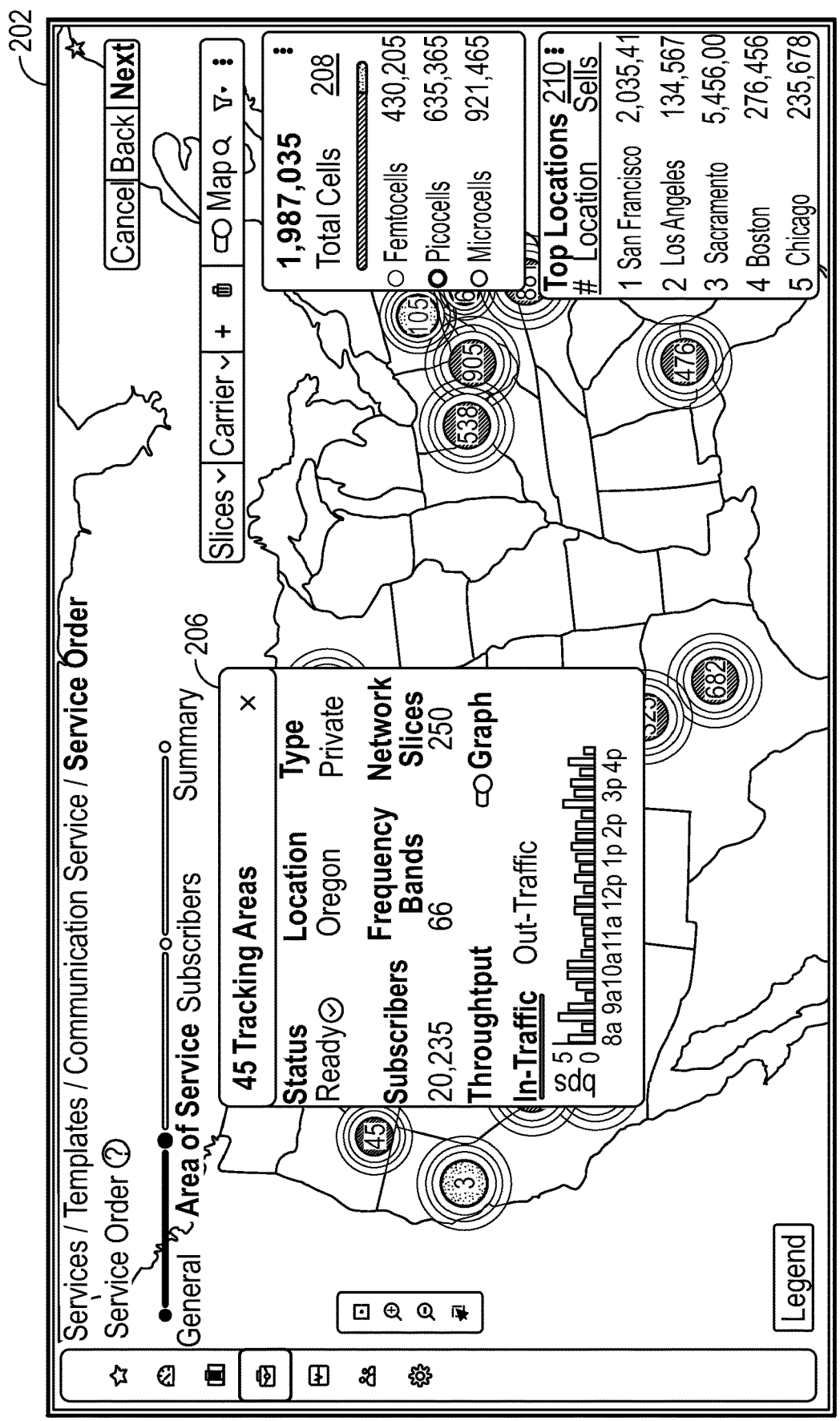

FIGS. 2A-2B are conceptual views of a user interface for visualizing tracking areas, in accordance with techniques described in the disclosure. FIGS. 2A-2B will be discussed in relation with aspects of FIG. 1.

In the example of FIG. 2A, visualization unit 120 may generate a user interface representing tracking areas overview screen 202 that provides overview visualization of a plurality of tracking areas. In some examples, visualization unit 120 may generate tracking areas overview screen 202 and provide the tracking areas overview screen 202 for display via user interface 106 of visualization management portal 104. In the example illustrated in FIG. 2A, tracking areas overview screen 202 includes user interface elements representing sets of tracking areas and may further indicate the number of tracking areas in a particular graphical region. In this example, the user interface element 204 may represent a particular set of tracking areas in a particular geographical region. In some examples, user interface element 204 may indicate a number of tracking areas (e.g., 45) within the set of tracking areas.

In some examples, tracking areas overview screen 202 may be used, by a user, to obtain further details of one or more tracking areas of the mobile network. In the example of FIG. 2B, visualization unit 120 may, in response to receiving user input indicative of a selection of one or more tracking areas, generate tracking areas overview screen 202 to further include user interface elements, such as a pop-up user interface element (e.g., pop-up window) overlaid on the tracking areas overview screen 202, that provides detailed information about a selected set of tracking areas. In this example, tracking areas overview screen 202 further includes a user interface element representing tracking areas overview window 206 providing additional information about the set of tracking areas 204 of FIG. 2A, such as the status, location, type, number of subscribers, the number of frequency bands, the number of network slices, and/or throughput traffic (e.g., in-traffic and/or out-traffic) of the set of tracking areas 206. In some examples, tracking areas overview screen 202 further includes user interface elements 208 and 210 representing a total number of cells (and total cells of each type of cell) and a list of locations having the largest number of cells, respectively.

Figure 3A:
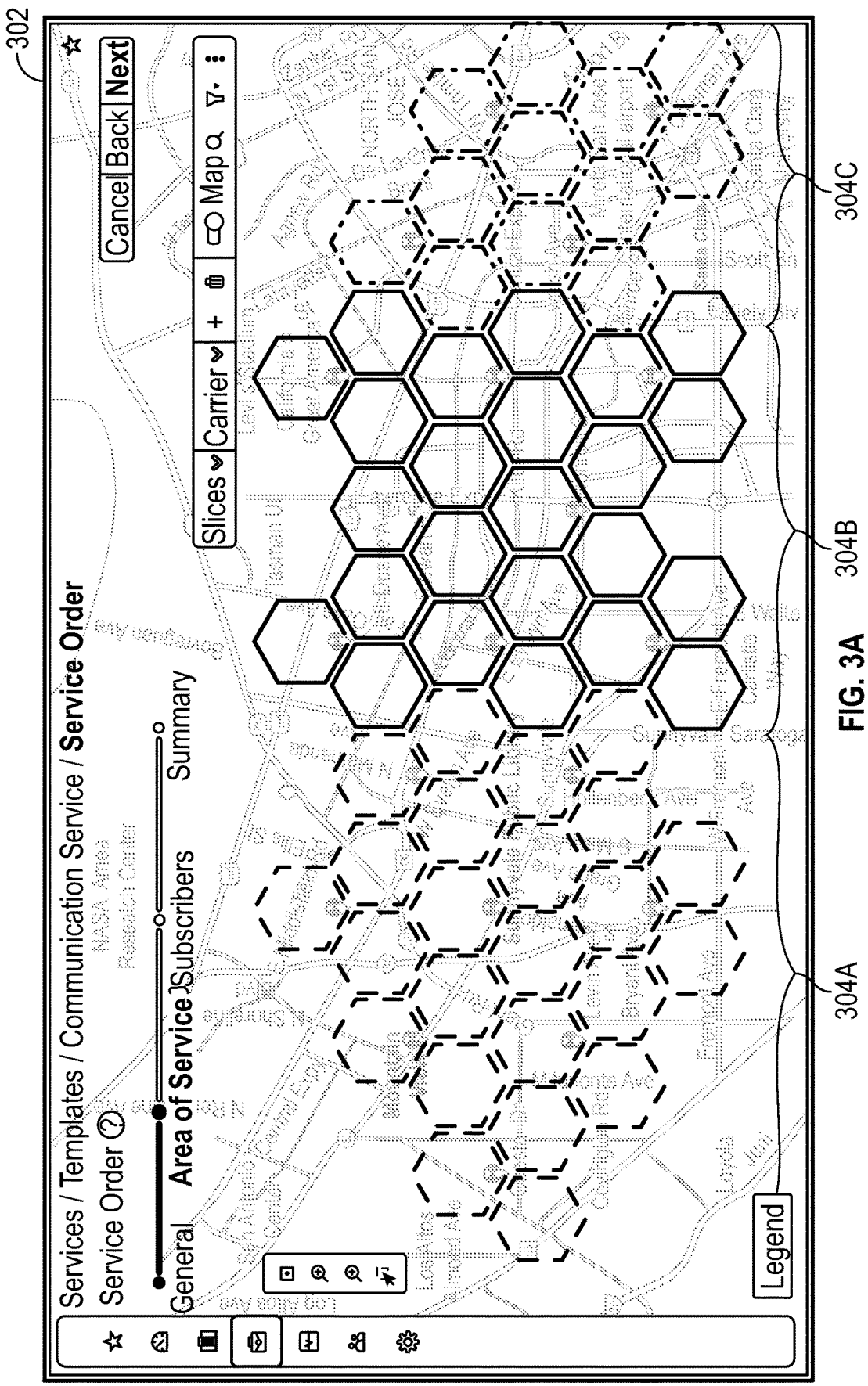
FIGS. 3A-3B are conceptual views of another user interface for visualizing tracking areas, in accordance with techniques described in the disclosure.
Figure 3B:
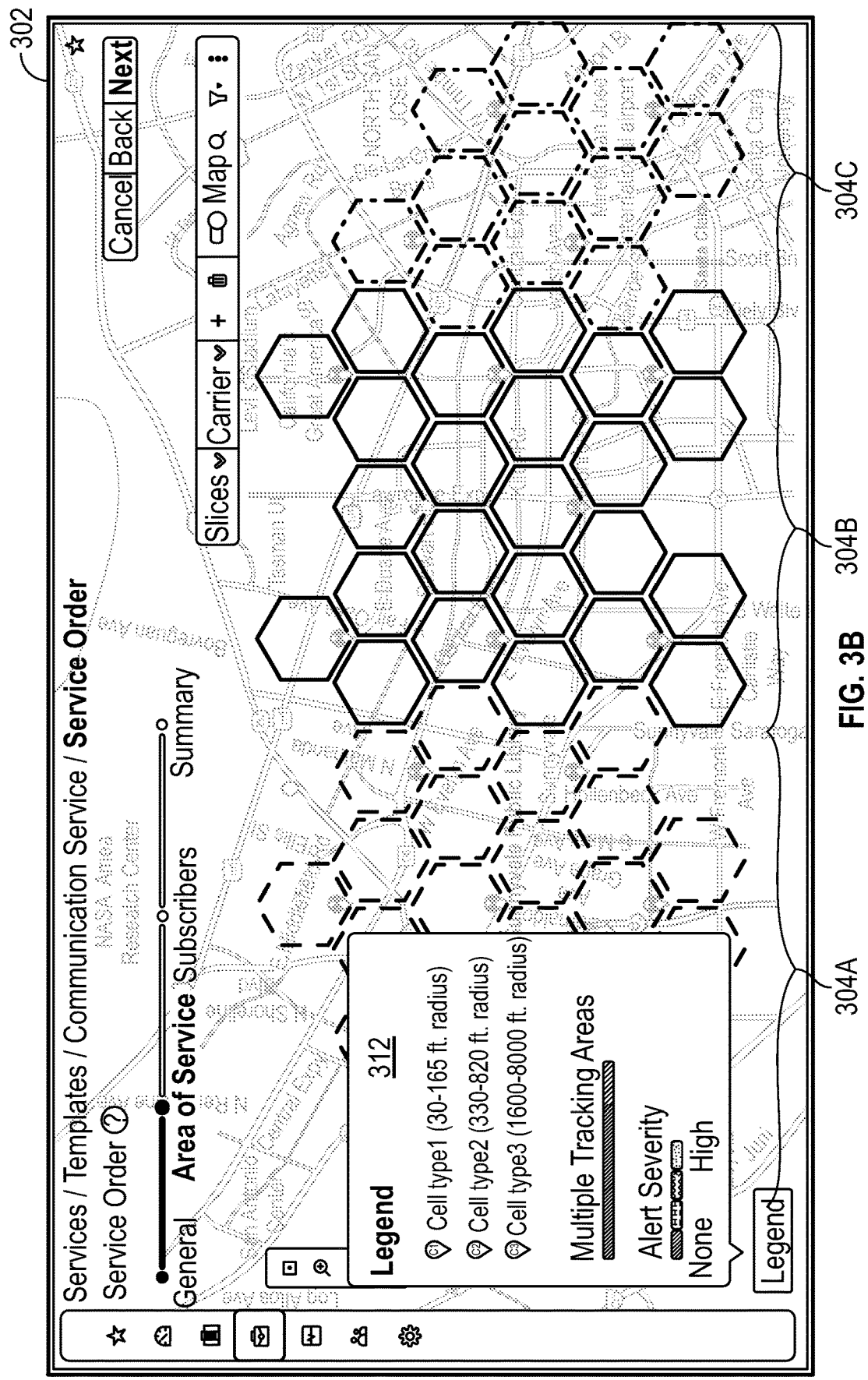

FIGS. 3A-3B are conceptual views of another user interface for visualizing tracking areas, in accordance with techniques described in the disclosure. FIGS. 3A-3B will be discussed in relation with aspects of FIG. 1.

In the example of FIG. 3A, visualization unit 120 may generate a user interface representing tracking areas cells screen 302 that provides a visualization of a set of cells of one or more tracking areas. In some examples, visualization unit 120 may generate tracking areas cells screen 302 and provide the tracking areas cells screen 302 for display via user interface 106 of visualization management portal 104. In the example illustrated in FIG. 3A, tracking areas cells screen 302 includes user interface elements each representing a corresponding cell of a tracking area. In this example, tracking area 304A includes a first set of cells represented by first cell user interface elements, tracking area 304B includes a second set of cells represented by second cell user interface elements, and tracking area 304C includes a third set of cells represented by third cell user interface elements. Each tracking area 304 may include a set of cells having the same cell type (e.g., femtocells, picocells, or microcells). For instance, the first set of cells of tracking area 304A may represent a first cell type ("cell type 1"), the second set of cells of tracking area 304B may represent a second cell type ("cell type 2"), and the third set of cells of tracking area 304C may represent a third cell type ("cell type 3"), as further illustrated in FIG. 3B. In this example, the first set of cells of tracking area 304A may be represented with a uniform visual characteristic (e.g., color, size, etc.) to indicate the cells of tracking area 304A are of a particular cell type. The second set of cells of tracking area 304B may be represented with a different visual characteristic (e.g., color) than the first set of cells of tracking area 304A to indicate the cells of tracking area 304B are of another cell type.

Figure 4A:
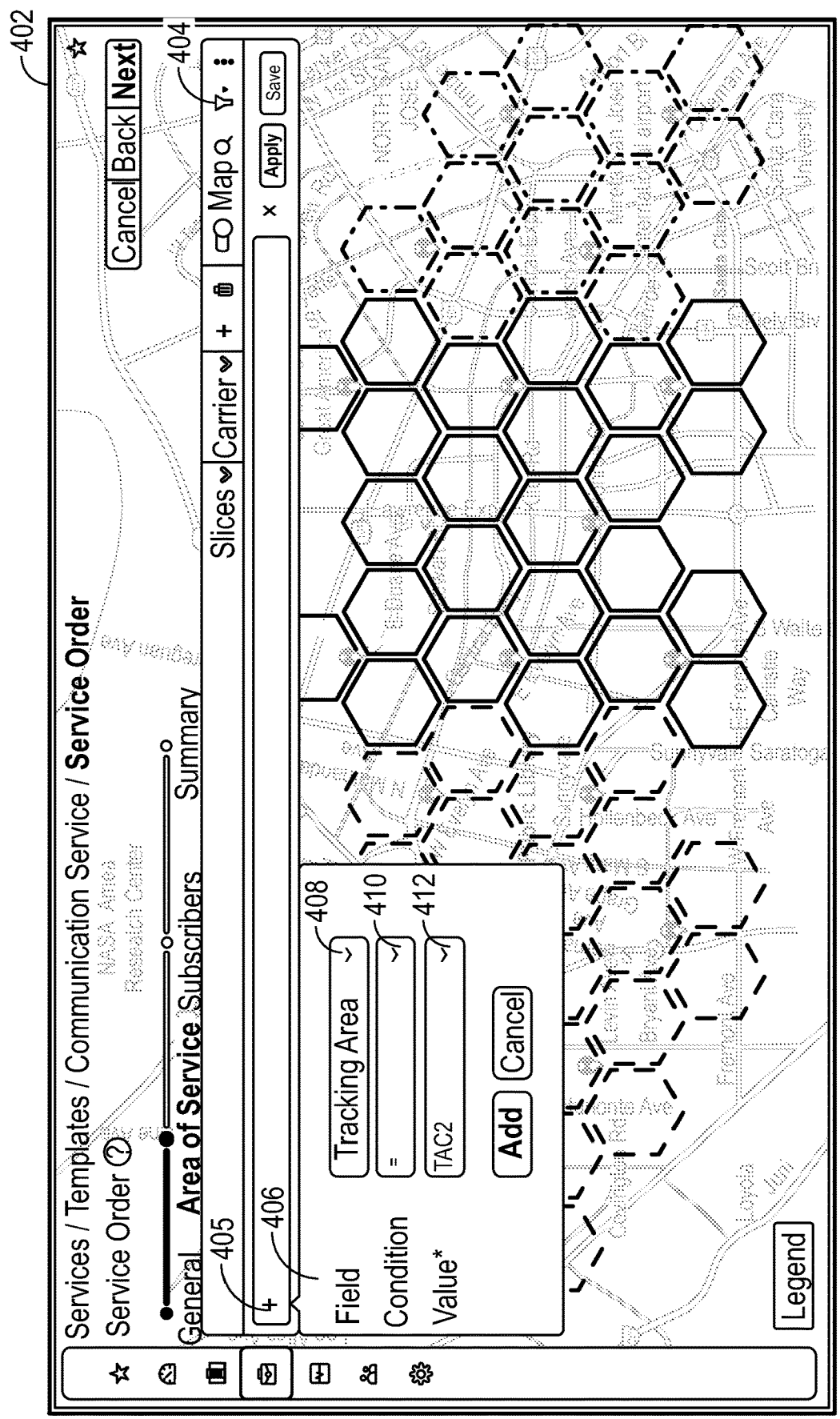
FIGS. 4A-4C are conceptual views of a user interface for filtering a visualization of tracking areas, in accordance with techniques described in the disclosure.
Figure 4B:
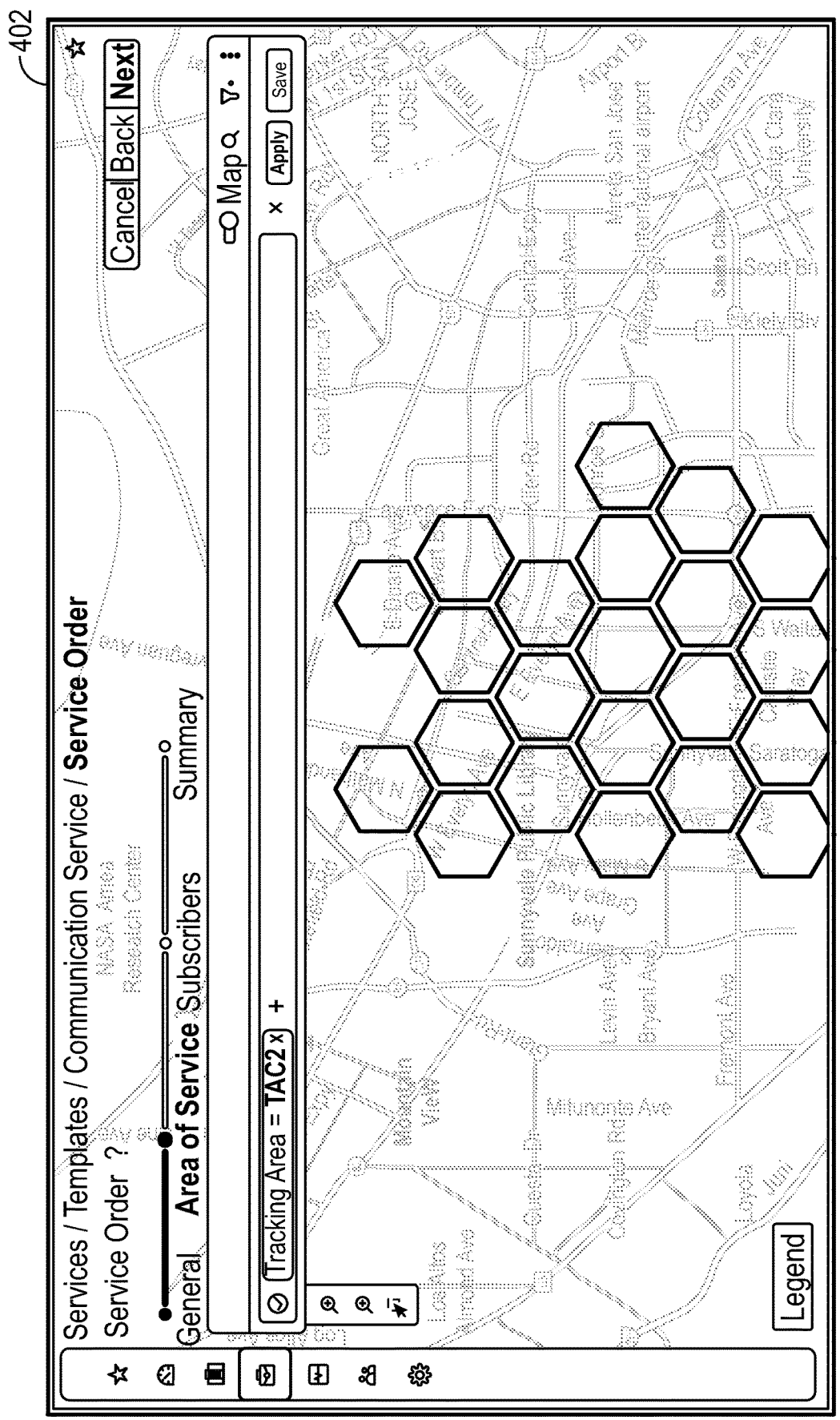
Figure 4C:
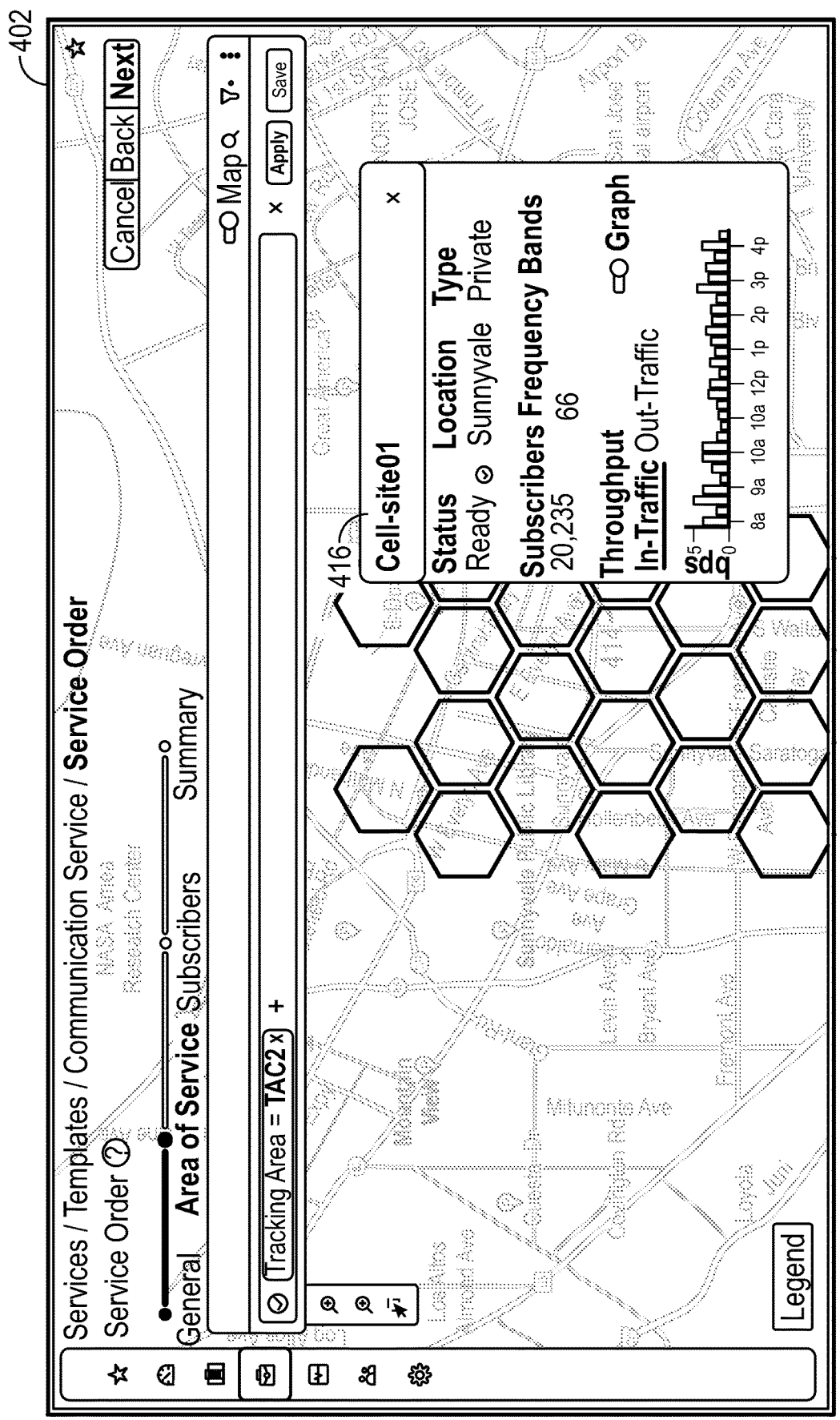

FIGS. 4A-4C are conceptual views of a user interface for filtering a visualization of tracking areas, in accordance with techniques described in the disclosure. FIGS. 4A-4C will be discussed in relation with aspects of FIG. 1.

In the example of FIG. 4A, visualization unit 120 may generate a user interface representing tracking areas filtering screen 402 that provides a user interface to enable a user to filter the visualization of one or more tracking areas. In some examples, visualization unit 120 may generate tracking areas filtering screen 402 and provide the tracking areas filtering screen 402 for display via user interface 106 of visualization management portal 104. In the example illustrated in FIG. 4A, tracking areas filtering screen 402 includes user interface elements representing selectable options and/or input fields by which a user may specify filtering criteria. In this example, in response to receiving user input data indicative of a selection of the user interface element representing a filtering option 404, visualization unit 120 may generate input field 405 to add filtering criteria, apply the filtering criteria, and/or save the filtering criteria. In response to receiving user input data indicative of a selection via the input field 405 to add filtering criteria, visualization unit 120 may generate user interface elements representing a filtering criteria window 406 to enable the user to specify, for example, a field 408, condition 410, and value 412 of the filter. In the example illustrated in FIG. 4A, the user may specify filtering criteria to only visualize a tracking area with the value of "TAC2" (e.g., "Tracking Area=TAC2"). The example filtering criteria illustrated in FIG. 4A is only one example and may include other filtering criteria to filter the visualization of tracking areas. In response to a selection to apply the filter, visualization unit 120 may receive the user input data indicative of the filtering criteria and, in response, modifies cell user interface elements of tracking areas within tracking areas filtering screen 402 to visually indicate the cells of tracking area TAC2 satisfy the filtering criteria and cells of other tracking areas do not satisfy the filtering criteria, as illustrated in FIG. 4B. In the example of FIG. 4B, the cell user interfaces of tracking areas that do not satisfy the filtering criteria are removed from display. In other examples (not shown), the cell user interface elements of tracking area TAC2 may be configured with a first visual characteristic (e.g., first color) to visually indicate the cell user interface elements of TAC2 satisfy the filtering criteria and cell user interface elements of other tracking areas with a second, different visual characteristic (e.g., second color) to visually indicate the cell user interfaces of other tracking areas do not satisfy the filtering criteria.

In the example of FIG. 4C, tracking areas filtering screen 402 may provide additional details of a particular cell of one or more tracking areas. For example, in response to user input data indicative of a selection of cell user interface element 414, visualization unit 120 may generate an additional user interface element, cell information window 416, within tracking areas filtering screen 402 to provide additional information about the cell represented by cell user interface element 414, such as the status of the cell (e.g., active or failed), location, type (e.g., private or public), number of subscribers, the number of frequency bands, and/or throughput traffic (e.g., in-traffic and/or out-traffic).

Figure 5A:
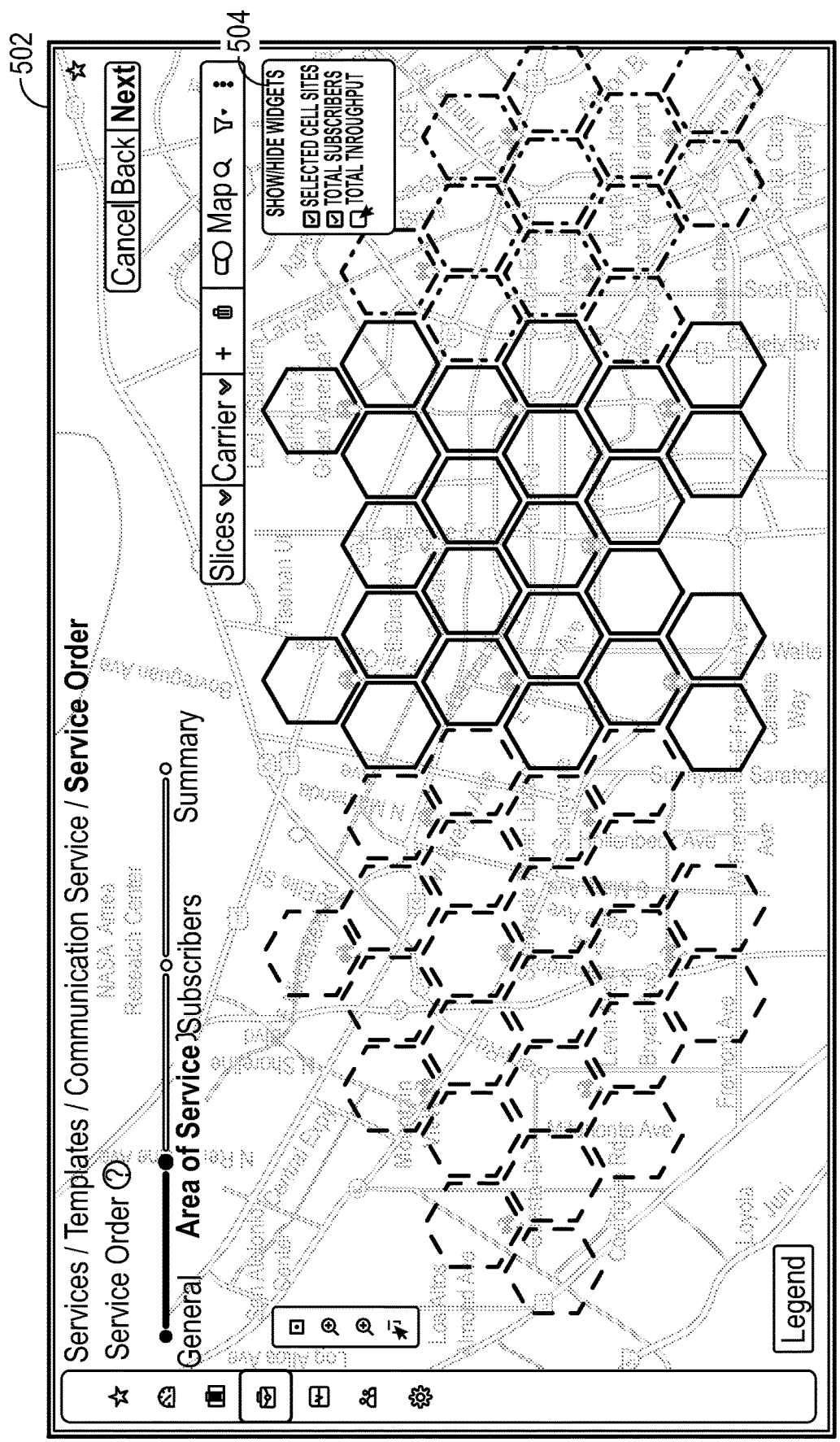
FIGS. 5A-5B are conceptual views of a user interface for configuration and display of widgets including information of tracking areas, in accordance with techniques described in the disclosure.
Figure 5B:
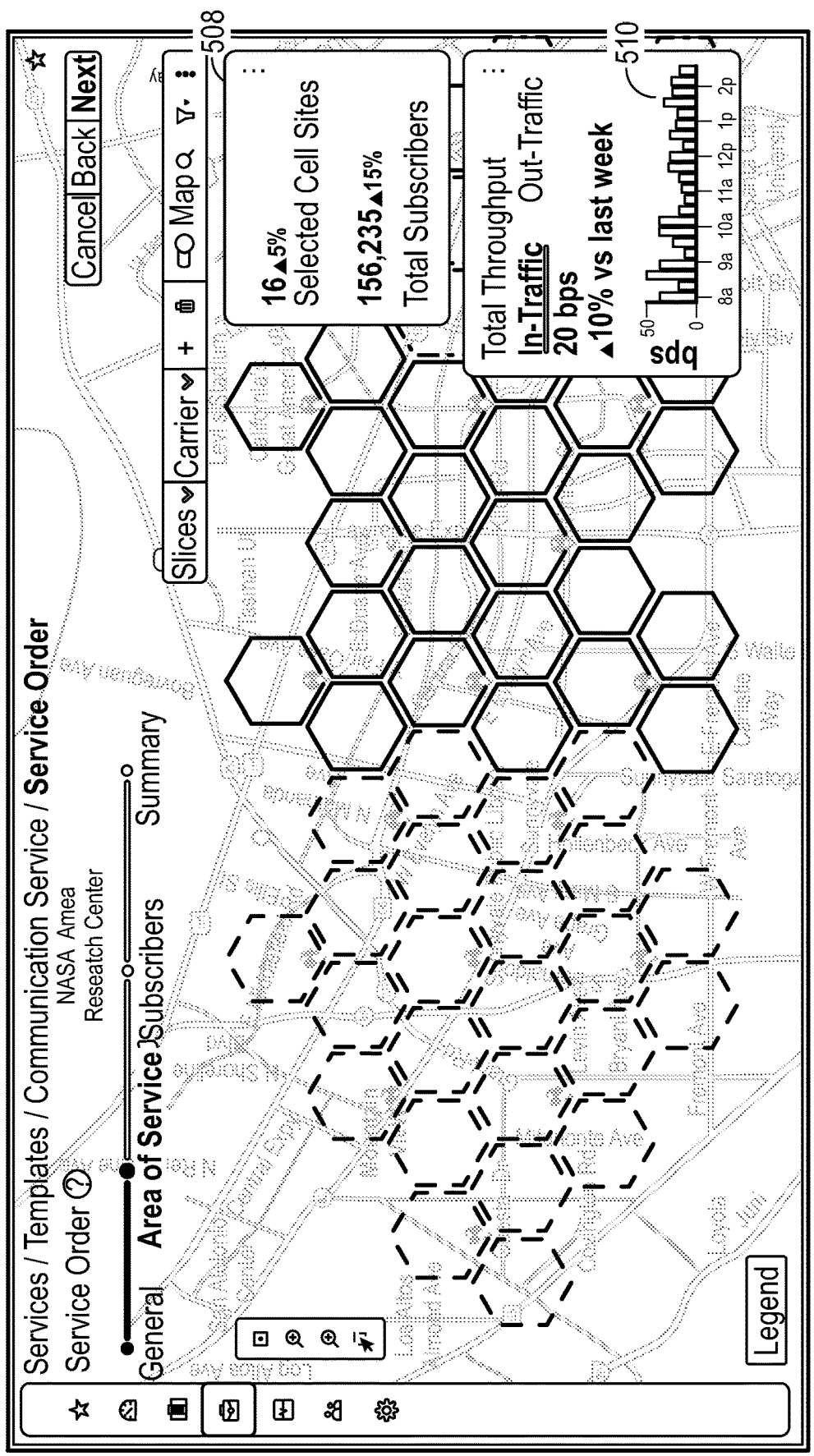

FIGS. 5A-5B are conceptual views of a user interface for configuration and display of widgets including information of tracking areas, in accordance with techniques described in the disclosure. FIGS. 5A-5B will be discussed in relation with aspects of FIG. 1.

In the example of FIG. 5A, visualization unit 120 may generate a user interface representing tracking areas widget screen 502 including user interface elements representing selectable options and/or input fields by which the user may specify the content of one or more widgets, such as selected cell sites, total subscribers, and/or total throughput. In response to receiving user input data indicative of a selection of the user interface element representing a widget options 504, visualization unit 120 may generate additional user interface elements within tracking areas widget screen 502 representing widgets 508 and 510 including information selected from widget options 504, as illustrated in FIG. 5B.

Figure 6:
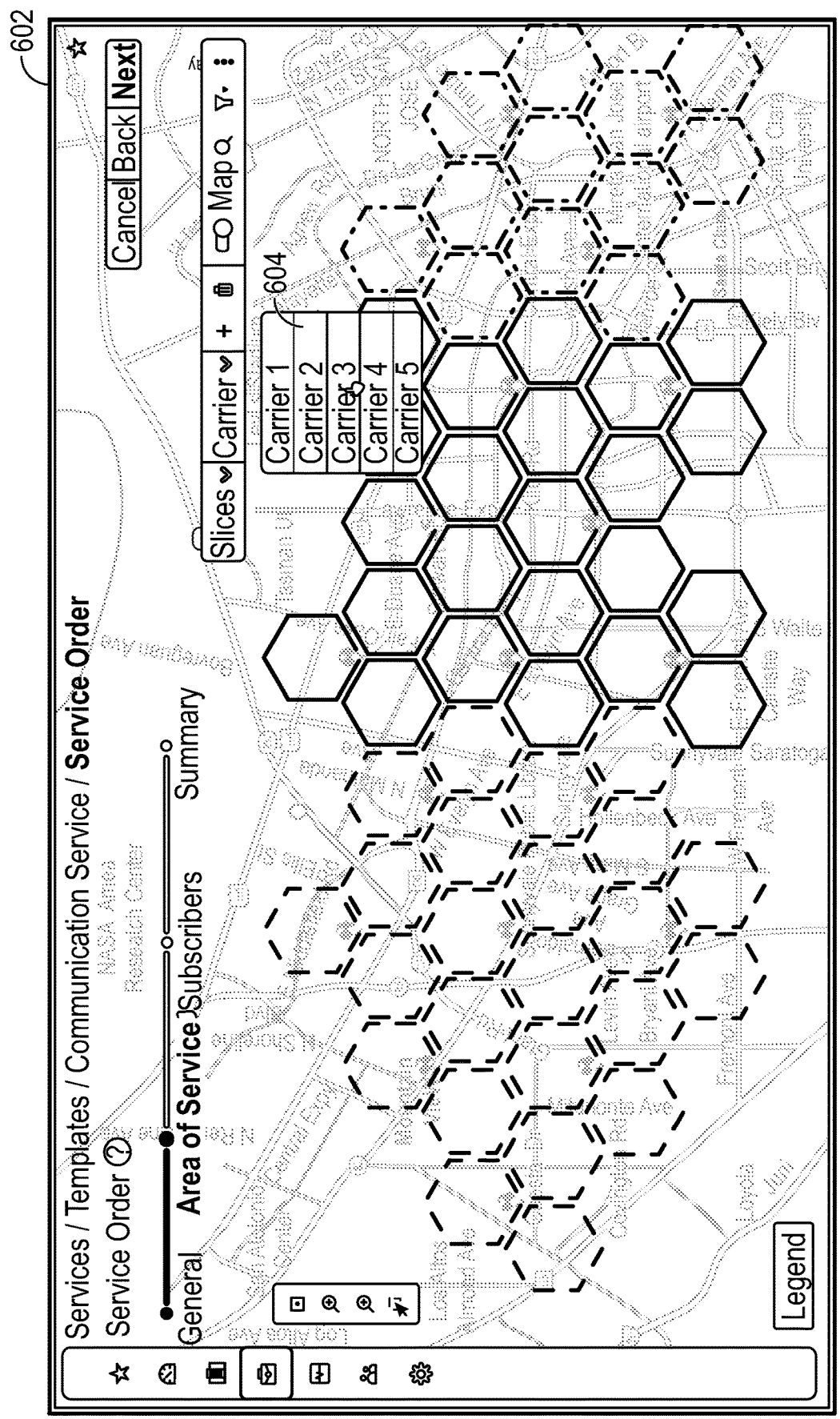
FIG. 6 is a conceptual view of a user interface for filtering a visualization of tracking areas based on a mobile network provider, in accordance with techniques described in the disclosure.

FIG. 6 is a conceptual view of a user interface for filtering a visualization of tracking areas based on a mobile network provider, in accordance with techniques described in the disclosure. FIG. 6 will be discussed in relation with aspects of FIG. 1.

In the example of FIG. 6, visualization unit 120 may generate a user interface representing tracking areas carrier screen 602 that provides filtered visualization of one or more tracking areas based on a mobile network provider (e.g., mobile network provider frequency). In some examples, visualization unit 120 may generate tracking areas carrier screen 602 and provide the tracking areas carrier screen 602 for display via user interface 106 of visualization management portal 104. In the example illustrated in FIG. 6, tracking areas carrier screen 602 includes a user interface element representing carrier filtering option 604 with selectable options and/or input fields by which the mobile network operator may specify the mobile network provider for the filtered view. In this example, in response to receiving user input data indicative of a selection of a particular mobile network provider within carrier filtering option 604, visualization unit 120 may modify cell user interface elements of tracking areas within the tracking areas carrier screen 602 to visually indicate the tracking areas with cells that correspond to the particular mobile network provider. For example, the cell user interfaces of tracking areas that correspond to the particular mobile network provider are displayed within tracking areas carrier screen 602 and the cell user interfaces of tracking areas that do not correspond to the particular mobile network provider are removed from display within tracking areas carrier screen 602. In other examples (not shown), the cell user interface elements of tracking areas that correspond to the particular mobile network provider may be configured with a first visual characteristic (e.g., first color) to visually indicate the cell user interface elements of the tracking areas correspond to the particular mobile network provider and the cell user interface elements of other tracking areas may be configured with a second, different visual characteristic (e.g., second color) to visually indicate the cell user interfaces of other tracking areas do not correspond to the particular mobile network provider.

Figure 7:
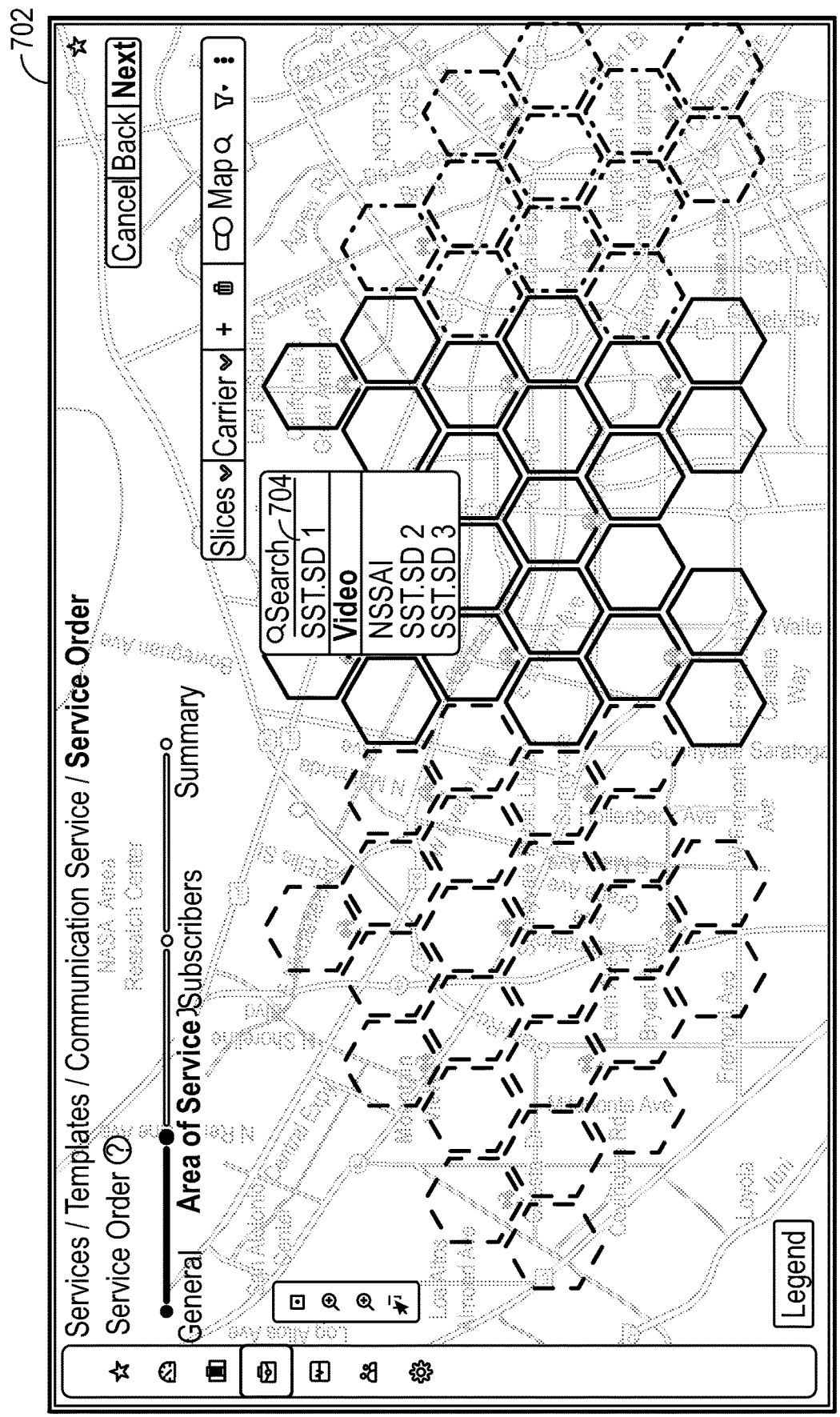
FIG. 7 is a conceptual view of a user interface screen for filtering a visualization of tracking areas based on a network slice (e.g., service), in accordance with techniques described in the disclosure.

FIG. 7 is a conceptual view of a user interface for filtering a visualization of tracking areas based on a network slice (e.g., service), in accordance with techniques described in the disclosure. FIG. 7 will be discussed in relation with aspects of FIG. 1.

In the example of FIG. 7, visualization unit 120 may generate a user interface representing tracking areas slice screen 702 that provides a filtered visualization of one or more tracking areas based on a network slice. In some examples, visualization unit 120 may generate tracking areas slice screen 702 and provide the tracking areas slice screen 702 for display via user interface 106 of visualization management portal 104. In the example illustrated in FIG. 7, tracking areas slice screen 702 includes user interface elements representing a slice filtering option 704 with selectable options and/or input fields by which the user may specify the network slice for the filtered view. In this example, in response to receiving user input data indicative of a selection of the user interface element representing a slice filtering option 704, visualization unit 120 may modify the cell user interface elements of tracking areas within tracking areas slice screen 702 to visually indicate the tracking areas with cells that implement a particular network slice (e.g., Video). For example, the cell user interfaces of tracking areas that implement the video network slice are displayed within tracking areas slice screen 702 and the cell user interfaces of tracking areas that do implement the video network slice are removed from display within tracking areas carrier screen 602. In other examples (not shown), the cell user interface elements of tracking areas that implement the video network slice may be configured with a first visual characteristic (e.g., first color) to visually indicate the cell user interface elements of the tracking areas implement the video network slice and the cell user interface elements of other tracking areas may be configured with a second, different visual characteristic (e.g., second color) to visually indicate the cell user interfaces of other tracking areas do not implement the video network slice.

FIGS. 8A-8F are conceptual views of a user interface screen for visualizing the status of tracking areas, in accordance with techniques described in the disclosure. FIGS. 8A-8F will be discussed in relation with aspects of FIG. 1.

Figure 8A:
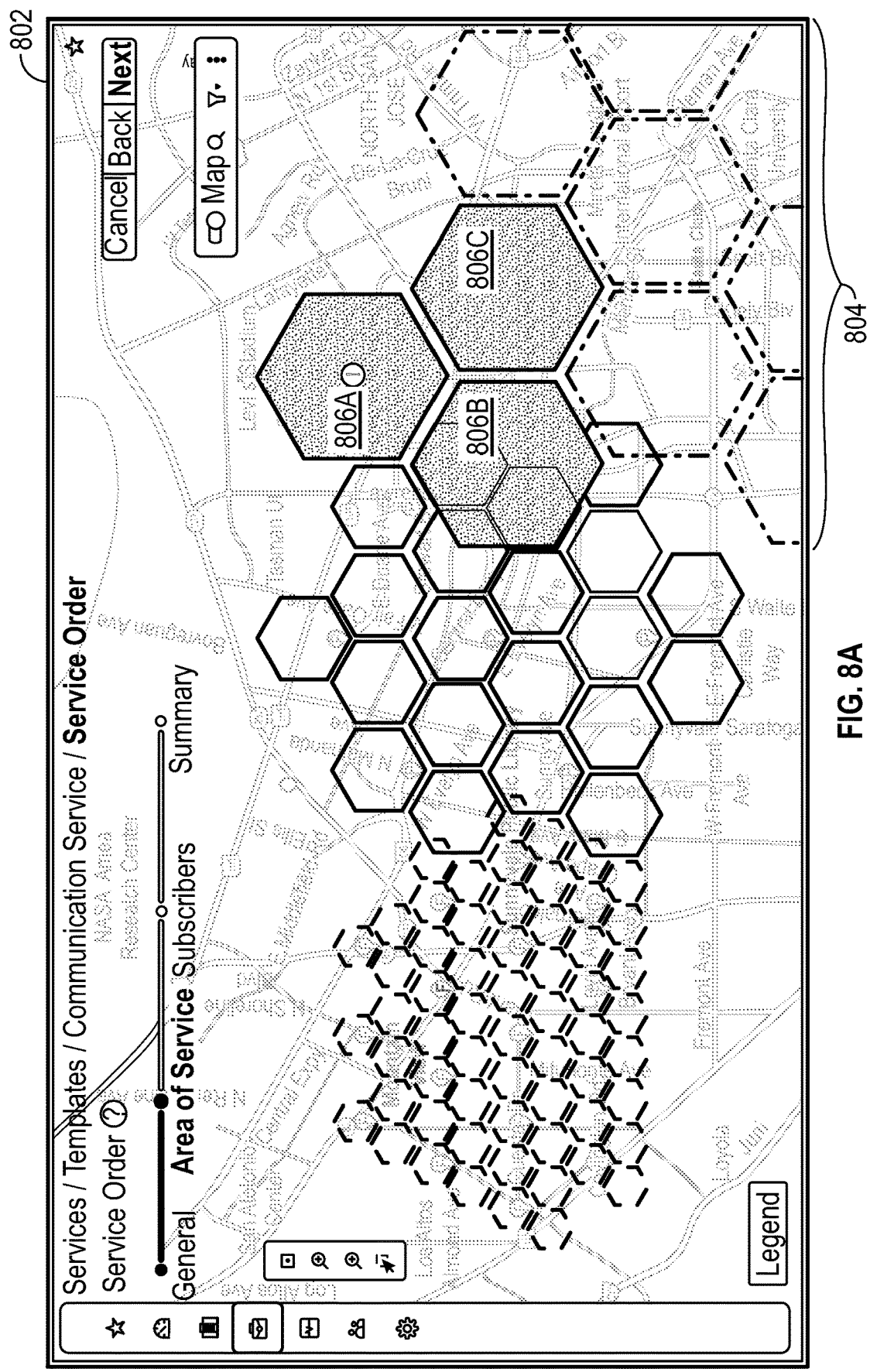

In the example of FIG. 8A, visualization unit 120 may generate a user interface representing tracking areas alert map screen 802 that provides a visualization of the status of one or more cells of tracking areas on a map. In some examples, visualization unit 120 may generate tracking areas alert map screen 802 and provide the tracking areas alert map screen 802 for display via user interface 106 of visualization management portal 104. In the example illustrated in FIG. 8A, tracking areas alert map screen 802 includes user interface elements representing the status of one or more cells of a tracking area. In this example, tracking area 804 includes a set of cells. Each user interface element representing a cell of tracking area 804 may indicate a status of the cell. For example, user interface elements representing cells 806A-806C (collectively, "cells 806") of tracking area 804 may indicate the status of cells 806 have failed. In some examples, the user interface elements representing cells 806 may have an indication that the cells have failed (e.g., exclamation icon), a particular color (e.g., red), and/or other indication that cells 806 have failed. Other cells of tracking area 804 may have a different color and/or other indication that the other cells of tracking area 804 are active.

In the example of FIG. 8B, visualization unit 120 may generate a user interface representing tracking areas alert list screen 810 that provides a visualization of the status of tracking areas in a list. In some examples, visualization unit 120 may generate tracking areas alert list screen 810 and provide the tracking areas alert list screen 810 for display via user interface 106 of visualization management portal 104. In the example illustrated in FIG. 8B, tracking areas alert list screen 810 includes user interface elements representing the status of one or more tracking areas. In this example, each of tracking areas 812A-812C (collectively, "tracking areas 812") includes a set of cells. Tracking areas alert list screen 810 includes a status user interface element representing the status of each tracking area 812. As one example, the user interface element representing status 818 may have an indication that tracking area 812C ("TRACKING AREA3") has failed (e.g., exclamation icon), a particular color (e.g., red), and/or other indication that one or more cells within the tracking area have failed.

As illustrated in FIG. 8B, tracking areas alert list screen 810 may also include user interface elements representing other information of tracking areas 812, such as the total number of cells, the number of users, the number of cells selected for the tracking area, etc.

In some examples, tracking areas alert list screen 810 may provide a visualization of the status of individual cells of a tracking area. For example, as illustrated in FIG. 8C, a mobile network provider may select to drill-down from the list of the tracking areas to determine the status of individual cells of a particular tracking area. In the example illustrated in FIG. 8C, the selection of the user interface element representing tracking area 812A (e.g., "TRACKING AREA1") may cause visualization unit 120 to modify tracking areas alert list screen 810 to further include user interface elements representing rows 820 indicating the status of individual cells of tracking area 812A. Although not shown in FIG. 8C, the mobile network provider may select the user interface element representing tracking area 812C to cause visualization unit 120 to modify tracking areas alert list screen 810 to further include user interface elements representing rows indicating the status of individual cells of TRACKING AREA3 that have failed (e.g., cells 806 of FIG. 8A).

Figure 8D:
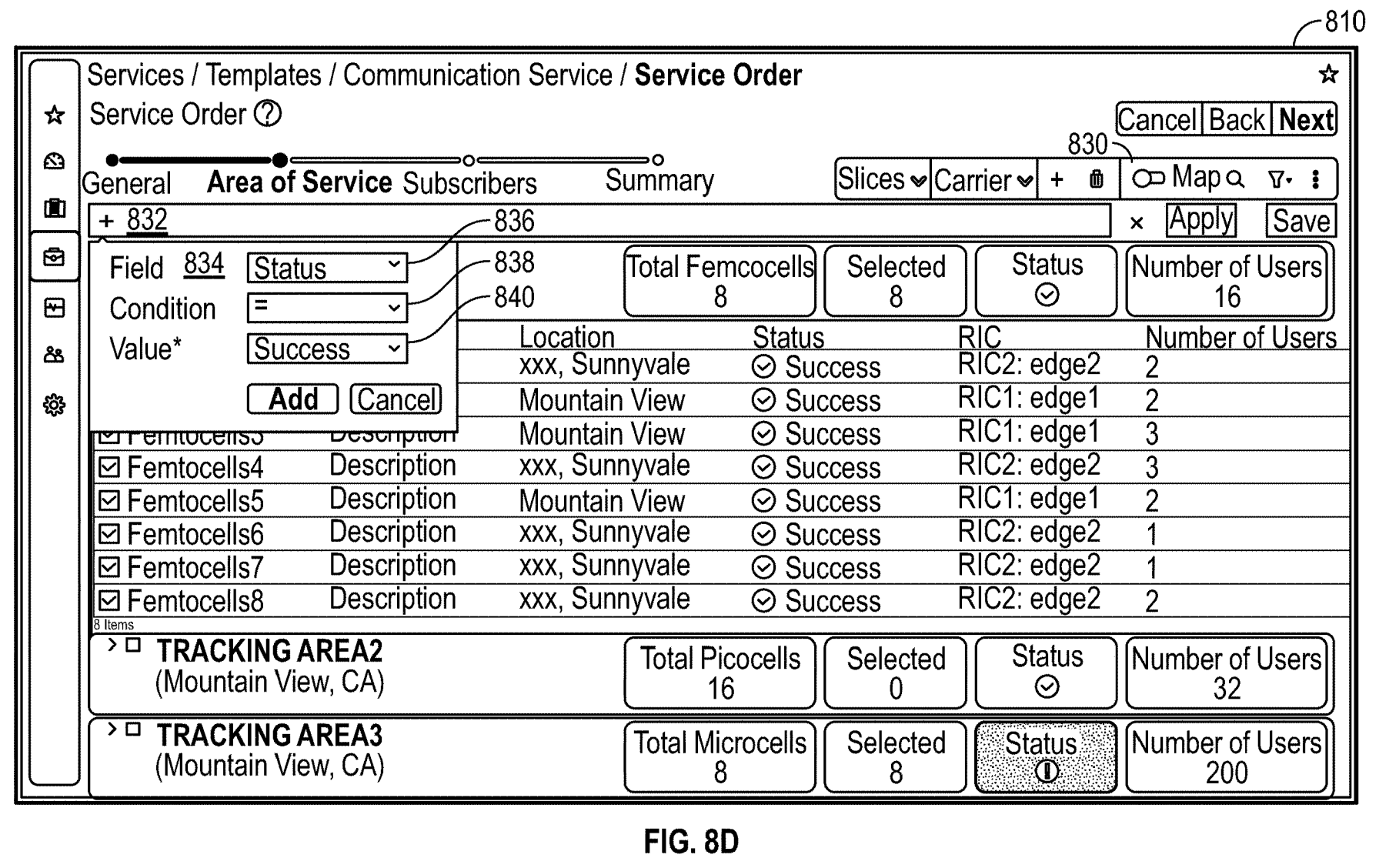

In some examples, tracking areas alert list screen 810 may provide a filtered visualization of the status of tracking areas or individual cells of the tracking area. In the example illustrated in FIG. 8D, tracking areas alert list screen 810 includes user interface elements representing selectable options and/or input fields by which a user may specify filtering criteria. In this example, in response to receiving user input data indicative of a selection of the user interface element representing a filtering option 830, visualization unit 120 may generate input field 832 to add filtering criteria, apply the filtering criteria, and/or save the filtering criteria. In response to receiving user input data indicative of a selection via the input field 832 to add filtering criteria, visualization unit 120 may generate user interface elements representing a filtering criteria window 834 to enable the user to specify, for example, a field 836, condition 838, and value 840 of the filter. In the example illustrated in FIG. 8D, the user may specify filtering criteria to only visualize tracking areas (or cells) with a status of "SUCCESS" (e.g., "Status=SUCCESS"). The example filtering criteria illustrated in FIG. 8D is only one example and may include other filtering criteria to filter the visualization of tracking areas. In response to receiving the user input data indicative of a selection to apply the filter, visualization unit 120 may modify the tracking areas alert list screen 810 to include user interface elements representing the one or more rows of tracking areas (e.g., TRACKING AREA1 and TRACKING AREA2) and/or cells of the tracking areas that satisfy the filtering criteria, as illustrated in FIG. 8E.

In another example illustrated in FIG. 8F, the user may specify filtering criteria to only visualize tracking areas (or cells) on the edge (e.g., "MC=RIC2: edge2") with a status of "FAIL" (e.g., "Status=FAIL"). In response to receiving user input data indicative of a selection to apply the filter, visualization unit 120 may modify the tracking areas alert list screen 810 to include user interface elements representing the one or more rows of tracking areas (e.g., TRACKING AREA3) and/or cells of the tracking areas that satisfy the filtering criteria, as illustrated in FIG. 8F.

Figure 9:
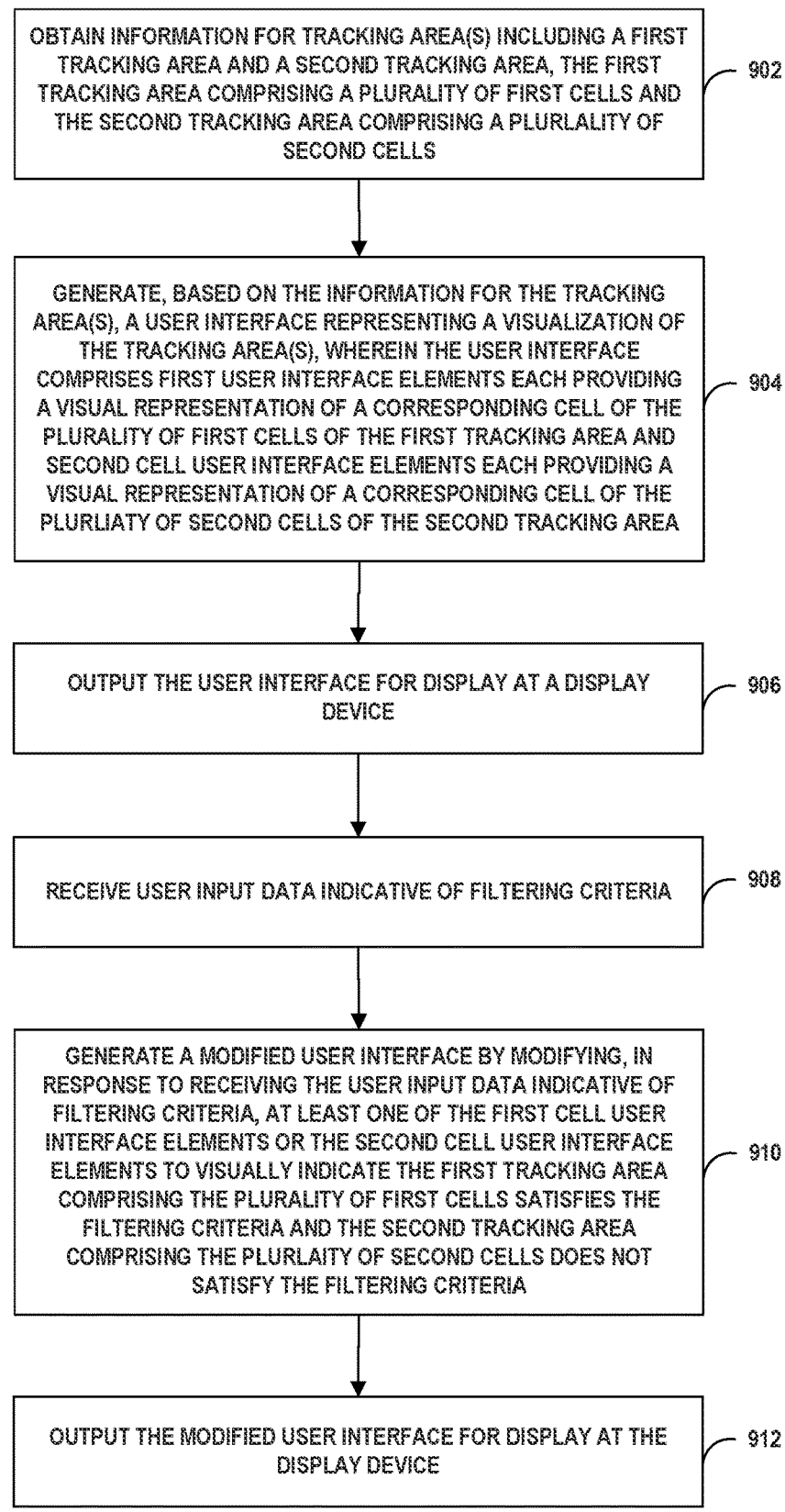
FIG. 9 is a flowchart illustrating example operations of a visualization management portal and monitoring system, in accordance with techniques described in the disclosure.

FIG. 9 is a flow diagram illustrating example operations of a visualization management portal and monitoring system, in accordance with one or more techniques of this disclosure. For ease of illustration, FIG. 9 is described with respect to visualization management portal 104 and monitoring system 102 of FIG. 1.

Monitoring system 102 obtains information of a plurality of tracking areas including a first tracking area and a second tracking area, the first tracking area comprising a plurality of first cells and the second tracking area comprising a plurality of second cells (902). For example, monitoring system 102 may obtain information from a NSMF and/or NSSMF of the tracking areas each comprising a plurality of cells used to implement network slices within RAN 130. Monitoring system 102 generates, based on the information for the plurality of tracking areas, a user interface representing a visualization of the plurality of tracking areas, wherein the user interface comprises first user interface elements each providing a visual representation of a corresponding cell of the plurality of first cells of the first tracking area and second cell user interface elements each providing a visual representation of a corresponding cell of the plurality of second cells of the second tracking area (904). For example, visualization unit 120 may generate a user interface representing an overview visualization of the tracking areas of mobile networks and output the user interface for display at a display device (906). In some examples, visualization unit 120 may generate a user interface including cell user interface elements each providing a visual representation of corresponding cells of a tracking area on a map (e.g., tracking areas cells screen 302 illustrated in FIG. 3A) or as a list (e.g., tracking areas alert list screen 810 illustrated in FIG. 8B). In some examples, visualization unit 120 may further generate user interface elements representing detailed information about a selected tracking area or cell, such as a pop-up user interface element (e.g., pop-up window) overlaid on the user interface with additional information about the selected tracking area (e.g., tracking area overview window 206 illustrated in FIG. 2B) or cell (e.g., cell information window 416 illustrated in FIG. 4C).

In some examples, visualization management portal 104 may receive, from client device 101 and through user interface 106, user input data indicative of one or more filtering criteria to filter a the user interface (908) and in response to receiving user input data indicative of the filtering criteria, monitoring system 102 generates a modified user interface by modifying at least one of the first cell user interface elements or the second cell user interface elements to visually indicate the first tracking area comprising the plurality of first cells satisfies the filtering criteria and the second tracking area comprising the plurality of second cells does not satisfy the filtering criteria (910) and outputs the modified user interface for display at the display device (912). For example, in response to receiving user input data indicative of filtering criteria specifying a particular tracking area (e.g., "Tracking Area=TAC2" illustrated in FIG. 4A), visualization unit 102 modifies the user interface by displaying the user interface elements representing the cells of tracking area (e.g., TAC2) that satisfies the filtering criteria and removes from display the user interface elements representing the cells of tracking areas that do not satisfy the filtering criteria (e.g., as illustrated in FIG. 4B). In another example, in response to receiving user input data indicative of filtering criteria specifying a particular mobile network provider (e.g., frequency of mobile network provider), visualization unit 120 modifies the user interface by displaying the user interface elements representing the cells of one or more tracking areas that are associated with the particular mobile network provider and removes from display the user interface elements representing the cells of tracking areas that are not associated with the particular mobile network provider. In some examples, in response to receiving user input data indicative of filtering criteria specifying a service type of network slices (e.g., "Video" from slice filtering option 704 illustrated in FIG. 7), visualization unit 120 modifies the user interface by displaying the user interface elements representing the cells of one or more tracking areas that are used to implement network slices for Video and removes from display the user interface elements representing the cells of tracking areas that are not used to implement network slices for Video. In some examples, in response to receiving user input data indicative of filtering criteria specifying a particular status of tracking areas or cells (e.g., "Status=SUCCESS" illustrated in FIG. 8D), visualization unit 102 modifies the user interface by displaying the user interface elements representing the cells of tracking areas that have a status of success with a particular color or symbol and displaying the user interface elements representing cells of tracking areas that have a status of failed with a different color or symbol (e.g., as illustrated in FIG. 8E).

Figure 10:
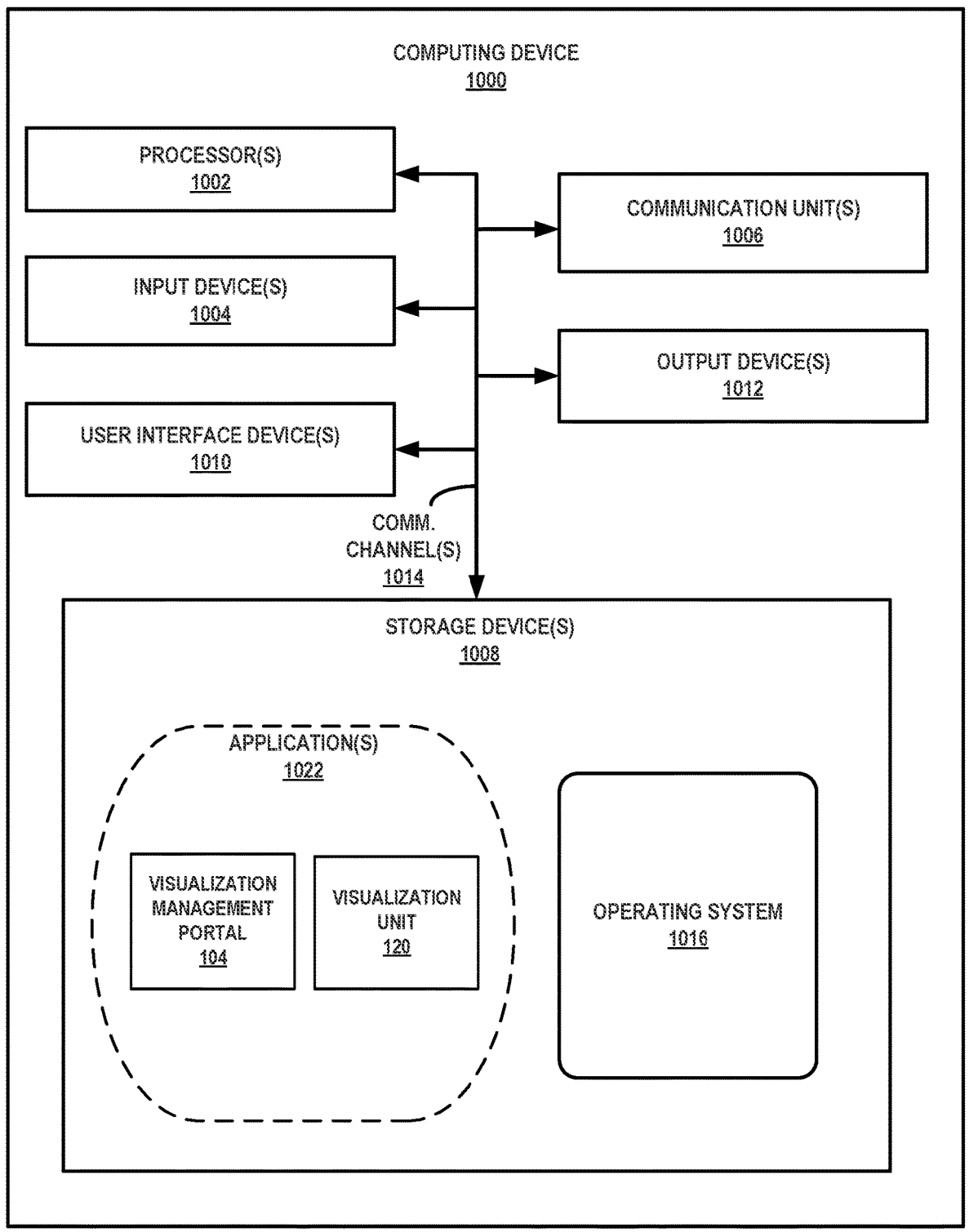
FIG. 10 is a block diagram illustrating further details of one example of a computing device that operates in accordance with one or more techniques of the present disclosure.

FIG. 10 is a block diagram illustrating further details of one example of a computing device that operates in accordance with one or more techniques of the present disclosure. FIG. 10 may illustrate a particular example of a server or other computing device 1000 that includes one or more processor(s) 1002 for executing any one or more of visualization management portal 104, visualization unit 120, or any other system, application, node software, or module described herein. Other examples of computing device 1000 may be used in other instances. Although shown in FIG. 10 as a stand-alone computing device 1000 for purposes of example, a computing device may be any component or system that includes one or more processors or other suitable computing environment for executing software instructions and, for example, need not necessarily include one or more elements shown in FIG. 10 (e.g., communication units 1006; and in some examples components such as storage device(s) 1008 may not be co-located or in the same chassis as other components). As shown in the specific example of FIG. 10, computing device 1000 includes one or more processors 1002, one or more input devices 1004, one or more communication units 1006, one or more output devices 1012, one or more storage devices 1008, and user interface (UI) device 1010. Computing device 1000, in one example, further includes one or more applications 1022 and operating system 1016 that are executable by computing device 1000. Each of components 1002, 1004, 1006, 1008, 1010, and 1012 are coupled (physically, communicatively, and/or operatively) for inter-component communications. In some examples, communication channels 1014 may include a system bus, a network connection, an inter-process communication data structure, a message bus, or any other method for communicating data. As one example, components 1002, 1004, 1006, 1008, 1010, and 1012 may be coupled by one or more communication channels 1014.

Processors 1002, in one example, are configured to implement functionality and/or process instructions for execution within computing device 1000. For example, processors 1002 may be processing circuitry capable of processing instructions stored in storage device 608. Examples of processors 1002 may include, any one or more of a microprocessor, a controller, a digital signal processor (DSP), an application specific integrated circuit (ASIC), a field-programmable gate array (FPGA), or equivalent discrete or integrated logic circuitry.

One or more storage devices 1008 may be configured to store information within computing device 1000 during operation. Storage device 1008, in some examples, is described as a computer-readable storage medium. In some examples, storage device 1008 is a temporary memory, meaning that a primary purpose of storage device 1008 is not long-term storage. Storage device 1008, in some examples, is described as a volatile memory, meaning that storage device 1008 does not maintain stored contents when the computer is turned off. Examples of volatile memories include random access memories (RAM), dynamic random access memories (DRAM), static random access memories (SRAM), and other forms of volatile memories known in the art. In some examples, storage device 1008 is used to store program instructions for execution by processors 1002. Storage device 1008, in one example, is used by software or applications running on computing device 1000 to temporarily store information during program execution.

Storage devices 1008, in some examples, also include one or more computer-readable storage media. Storage devices 1008 may be configured to store larger amounts of information than volatile memory. Storage devices 1008 may further be configured for long-term storage of information. In some examples, storage devices 1008 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Computing device 1000, in some examples, also includes one or more communication units 1006. Computing device 1000, in one example, utilizes communication units 1006 to communicate with external devices via one or more networks, such as one or more wired/wireless/mobile networks. Communication units 1006 may include a network interface card, such as an Ethernet card, an optical transceiver, a radio frequency transceiver, or any other type of device that can send and receive information. In some examples, computing device 1000 uses communication unit 1006 to communicate with an external device.

Computing device 1000, in one example, also includes one or more user interface devices 1010. User interface devices 1010, in some examples, are configured to receive input from a user through tactile, audio, or video feedback. Examples of user interface devices(s) 1010 include a presence-sensitive display, a mouse, a keyboard, a voice responsive system, video camera, microphone or any other type of device for detecting a command from a user. In some examples, a presence-sensitive display includes a touch-sensitive screen.

One or more output devices 1012 may also be included in computing device 1000. Output device 1012, in some examples, is configured to provide output to a user using tactile, audio, or video stimuli. Output device 1012, in one example, includes a presence-sensitive display, a sound card, a video graphics adapter card, or any other type of device for converting a signal into an appropriate form understandable to humans or machines. Additional examples of output device 1012 include a speaker, a cathode ray tube (CRT) monitor, a liquid crystal display (LCD), or any other type of device that can generate intelligible output to a user.

Computing device 1000 may include operating system 1016. Operating system 1016, in some examples, controls the operation of components of computing device 600. For example, operating system 1016, in one example, facilitates the communication of one or more applications 1022 with processors 1002, communication unit 1006, storage device 1008, input device 1004, user interface devices 1010, and output device 1012.

Applications 1022 may also include program instructions and/or data that are executable by computing device 1000. Example applications 1022 executable by computing device 1000 may include applications and/or other software to implement capabilities described above. For example, applications 1022 can include applications associated with visualization management portal 104 and visualization unit 120.

The techniques described in this disclosure may be implemented, at least in part, in hardware, software, firmware or any combination thereof. For example, various aspects of the described techniques may be implemented within one or more programmable processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. The term "computer-readable storage media" refers to physical storage media, and not signals, carrier waves, or other transient media.

The invention claimed is:

1. A computing device comprising:
   one or more processors; and
   a memory comprising instructions that when executed by the one or more processors cause the one or more processors to:
   obtain information for a plurality of tracking areas including a first tracking area and a second tracking area, the first tracking area comprising a plurality of first cells and the second tracking area comprising a plurality of second cells;
   generate, based on the information for the plurality of tracking areas, a user interface providing a visual representation of the plurality of tracking areas, wherein the user interface comprises first cell user interface elements each providing a visual representation of a corresponding cell of the plurality of first cells of the first tracking area and second cell user interface elements each providing a visual representation of a corresponding cell of the plurality of second cells of the second tracking area;
   output the user interface for display at a display device;
   receive user input data indicative of filtering criteria to filter the user interface;
   generate, based on the user input data indicative of filtering criteria, a modified user interface by modifying at least one of the first cell user interface elements or the second cell user interface elements to visually indicate the first tracking area comprising the plurality of first cells satisfies the filtering criteria and the second tracking area comprising the plurality of second cells does not satisfy the filtering criteria; and output the modified user interface for display at the display device.

2. The computing device of claim 1, wherein to generate the user interface, the one or more processors are further configured to:

map, based on the obtained information for the plurality of tracking areas, the plurality of first cells to the first tracking area; and generate the first cell user interface elements with a uniform visual characteristic to visually indicate the plurality of first cells is associated with the first tracking area.

3. The computing device of claim 1, wherein the filtering criteria comprises one or more of a tracking area identifier, a mobile service provider, a service type, or status of the plurality of tracking areas.

4. The computing device of claim 1, wherein the one or more processors are further configured to:

receive user input data indicative of a selection of a particular cell of the first cell user interface elements; and generate, based on the user input data indicative of the selection of the particular cell of the first cell user interface elements, a pop-up user interface element overlaid on the user interface specifying information associated with the particular cell of the first cell user interface elements.

5. The computing device of claim 4, wherein the information associated with the particular cell of the first cell user interface elements comprises one or more of a status, location, type, number of subscribers, number of frequency bands, or traffic throughput of the cell.

6. The computing device of claim 1, wherein the first cell user interface elements are each configured with a particular color or symbol to visually indicate a status of a particular cell of the plurality of first cells.

7. The computing device of claim 1, wherein the one or more processors are further configured to:

receive user input data indicative of a selection of a group of tracking areas of the plurality of tracking areas; and generate, based on the user input data indicative of the selection of the group of tracking areas, a pop-up user interface element overlaid on the user interface specifying information associated with the group of tracking areas.

8. The computing device of claim 7, wherein the information associated with the group of tracking areas comprises one or more of a status, location, type, number of subscribers, number of frequency bands, number of network slices, or traffic throughput of the group of tracking areas.

9. The computing device of claim 1, wherein to modify at least one of the first cell user interface elements or the second cell user interface elements, the one or more processors are configured to:

display the first cell user interface elements; and remove from display the second cell user interface elements.

10. The computing device of claim 1, wherein to modify at least one of the first cell user interface elements or the second cell user interface elements, the one or more processors are configured to:

configure the first cell user interface elements with a first visual characteristic; and configure the second cell user interface elements with a second, different visual characteristic.

11. A method comprising:

obtaining, by a computing device, information for a plurality of tracking areas including a first tracking area and a second tracking area, the first tracking area comprising a plurality of first cells and the second tracking area comprising a plurality of second cells;

generating, by the computing device and based on the information for the plurality of tracking areas, a user interface representing a visualization of the plurality of tracking areas, wherein the user interface comprises first cell user interface elements each providing a visual representation of a corresponding cell of the plurality of first cells of the first tracking area and second cell user interface elements each providing a visual representation of a corresponding cell of the plurality of second cells of the second tracking area;

receiving, by the computing device, user input data indicative of filtering criteria to filter the user interface;

based on the user input data indicative of filtering criteria, generating, by the computing device, a modified user interface by modifying at least one of the first cell user interface elements or the second cell user interface elements to visually indicate the first tracking area comprising the plurality of first cells satisfies the filtering criteria and the second tracking area comprising the plurality of second cells does not satisfy the filtering criteria; and output the modified user interface for display at a display device.

12. The method of claim 11, wherein generating the user interface comprises:

mapping, based on the obtained information for the plurality of tracking areas, the plurality of first cells to the first tracking area;

generating the first cell user interface elements with a uniform visual characteristic to visually indicate the plurality of first cells is associated with the first tracking area.

13. The method of claim 11, wherein the filtering criteria comprises one or more of a tracking area identifier, a mobile service provider, a service type, or status of the plurality of tracking areas.

14. The method of claim 11, further comprising:

receiving, by the computing device, user input data indicative of a selection of a particular cell of the first cell user interface elements; and based on the user input data indicative of the selection of the particular cell of the first cell user interface elements, generating, by the computing device, a pop-up user interface element overlaid on the user interface specifying information associated with the particular cell of the first cell user interface elements.

15. The method of claim 14, wherein the information associated with the particular cell of the first cell user interface elements comprises one or more of a status, location, type, number of subscribers, number of frequency bands, or traffic throughput of the cell.

16. The method of claim 11, wherein generating the user interface representing a visualization of the plurality of tracking areas further comprises:

configuring, by the computing device, each of the first cell user interface elements with a particular color or symbol to visually indicate a status of a particular cell of the plurality of first cells.

17. The method of claim 11, further comprising:
receiving, by the computing device, user input data indicative of a selection of a group of tracking areas of the plurality of tracking areas; and
based on the user input data indicative of the selection of the group of tracking areas, generating, by the computing device, a pop-up user interface element overlaid on the user interface specifying information associated with the group of tracking areas.

18. The method of claim 17, wherein the information associated with the group of tracking areas comprises one or more of a status, location, type, number of subscribers, number of frequency bands, number of network slices, or traffic throughput of the group of tracking areas.

19. The method of claim 11, wherein modifying at least one of the first cell user interface elements or the second cell user interface elements comprises:
displaying, by the computing device, the first cell user interface elements; and
removing from display the second cell user interface elements.

20. Non-transitory computer-readable media comprising instructions that, when executed, cause one or more processors to:
obtain information for a plurality of tracking areas including a first tracking area and a second tracking area, the first tracking area comprising a plurality of first cells and the second tracking area comprising a plurality of second cells;
generate, based on the information for the plurality of tracking areas, a user interface representing a visualization of the plurality of tracking areas, wherein the user interface comprises first cell user interface elements each providing a visual representation of a corresponding cell of the plurality of first cells of the first tracking area and second cell user interface elements each providing a visual representation of a corresponding cell of the plurality of second cells of the second tracking area;
output the user interface for display at a display device;
receive user input data indicative of filtering criteria to filter the visualization of the user interface;
generate, based on the user input data indicative of filtering criteria, a modified user interface by modifying at least one of the first cell user interface elements or the second cell user interface elements to visually indicate the first tracking area comprising the plurality of first cells satisfies the filtering criteria and the second tracking area comprising the plurality of second cells does not satisfy the filtering criteria; and
output the modified user interface for display at the display device.

* * * * *